US008228450B2

(12) United States Patent
Huh et al.

(10) Patent No.: US 8,228,450 B2
(45) Date of Patent: Jul. 24, 2012

(54) LIQUID CRYSTAL DISPLAY

(75) Inventors: Su-Jung Huh, Yongin-si (KR); Min-Jae Kim, Suwon-si (KR); Duck-Jong Suh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 492 days.

(21) Appl. No.: 12/504,266

(22) Filed: Jul. 16, 2009

(65) Prior Publication Data
US 2010/0066932 A1 Mar. 18, 2010

(30) Foreign Application Priority Data

Sep. 16, 2008 (KR) .................. 10-2008-0090626

(51) Int. Cl.
*G02F 1/1343* (2006.01)
(52) U.S. Cl. .......................... 349/38; 349/167
(58) Field of Classification Search .................. None
See application file for complete search history.

(56) References Cited

U.S. PATENT DOCUMENTS

| 7,084,846 B2 * | 8/2006 | Adachi et al. .................. 345/89 |
| 7,701,628 B2 * | 4/2010 | Heckmeier et al. ............. 359/245 |
| 2008/0055521 A1 * | 3/2008 | Mizutani et al. ................ 349/96 |

* cited by examiner

*Primary Examiner* — Richard Kim
(74) *Attorney, Agent, or Firm* — Cantor Colburn LLP

(57) ABSTRACT

A liquid crystal display includes a thin film transistor, a liquid crystal capacitor, which is electrically connected to the thin film transistor and includes a liquid crystal layer, and a storage capacitor, which is electrically connected to the thin film transistor in parallel to the liquid crystal capacitor, wherein the liquid crystal layer has a positive dielectric anisotropy and is disposed in a twisted nematic mode, and a capacitance ratio of a capacitance of the storage capacitor to a capacitance of the liquid crystal capacitor is approximately 0.4 or more.

13 Claims, 18 Drawing Sheets

LIQUID CRYSTAL DISPLAY

This application claims priority to Korean Patent Application No. 10-2008-0090626, filed on Sep. 16, 2008, and all the benefits accruing therefrom under 35 U.S.C. §119, the contents of which in its entirety are herein incorporated by reference.

BACKGROUND OF THE INVENTION (a) Field of the Invention

This disclosure relates to a liquid crystal display.

(b) Description of the Related Art

A liquid crystal display, which is a widely used type of flat panel display, includes two panels on which field generating electrodes, such as pixel electrodes, common electrodes, or the like, are disposed. A liquid crystal layer is interposed between the panels. A voltage is applied to the field generating electrodes to generate an electric field across the liquid crystal layer. The alignment of liquid crystal molecules in the liquid crystal layer is determined by the electric field. The liquid crystal molecules control a polarization of incident light, thereby displaying an image.

The liquid crystal display can be used for various applications. In particular, the liquid crystal display can be used as the display in a portable apparatus such as a laptop computer. Since a portable display device is desirably easy to carry and light-weight, a battery incorporated in the portable display device has a practical capacity limit. Therefore, it is desirable for the display device to have low power consumption.

BRIEF SUMMARY OF THE INVENTION

In order to reduce the power consumption of the liquid crystal display, it is desirable to reduce a driving voltage, and it is important to select a condition wherein an excellent image quality can be displayed at a low driving voltage.

Disclosed is a liquid crystal display, which can display an image having an excellent image quality at a low driving voltage.

The above described and other drawbacks are alleviated by a liquid crystal display including a thin film transistor; a liquid crystal capacitor, which is electrically connected to a thin film transistor and comprises a liquid crystal layer; and a storage capacitor, which is electrically connected to the thin film transistor in parallel to the liquid crystal capacitor, wherein the liquid crystal layer has a positive dielectric anisotropy and is disposed in a twisted nematic mode, and a capacitance ratio of a capacitance of the storage capacitor to a capacitance of the liquid crystal capacitor is approximately 0.4 or more.

In an embodiment, the capacitance ratio may be approximately 0.7 or less.

In an embodiment, a dielectric anisotropy of the liquid crystal layer may be approximately 14 or more. In an embodiment, the dielectric anisotropy of the liquid crystal layer is in a range of approximately 15 to approximately 18. In an embodiment, the dielectric anisotropy of the liquid crystal layer may be in a range of approximately 15.1 to approximately 17.3.

In an embodiment, the liquid crystal layer comprises a liquid crystal composition selected from the group consisting of liquid crystal compositions I to IV, wherein the liquid crystal composition I comprises compounds of formulas

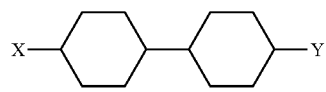

in an amount of approximately 31.5 weight percent,

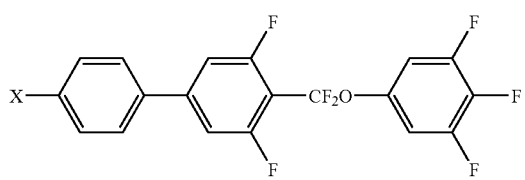

in an amount of approximately 15 weight percent,

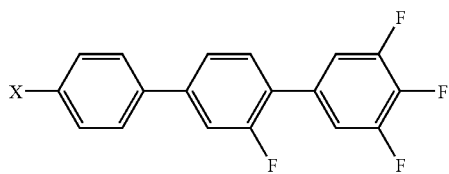

in an amount of approximately 10 weight percent,

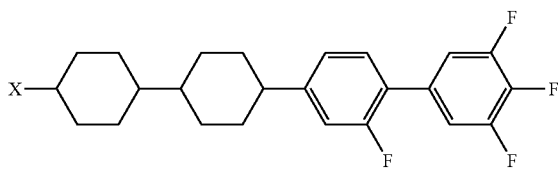

in an amount of approximately 7 weight percent,

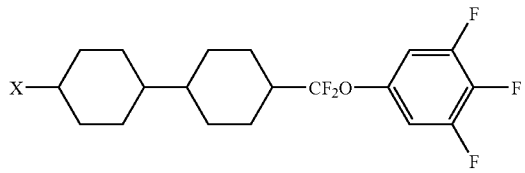

in an amount of approximately 18.5 weight percent,

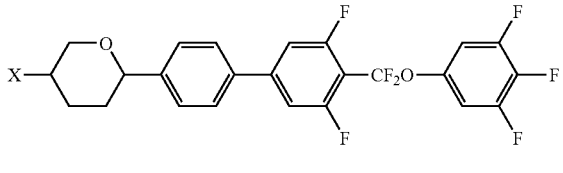

in an amount of approximately 12 weight percent,

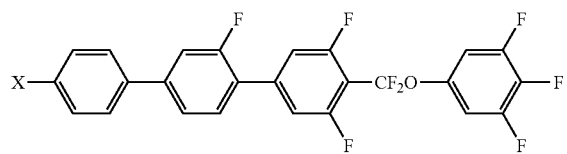

in an amount of approximately 6 weight percent,
the liquid crystal composition II comprises compounds of the formulas

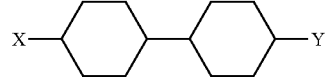

in an amount of approximately 41 weight percent,

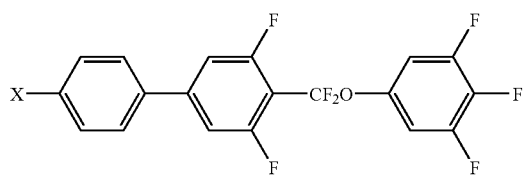

in an amount of approximately 13 weight percent,

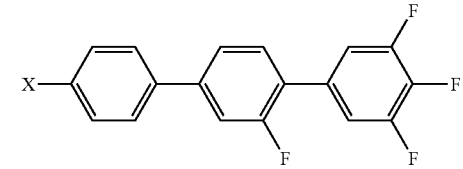

in an amount of approximately 8.5 weight percent,

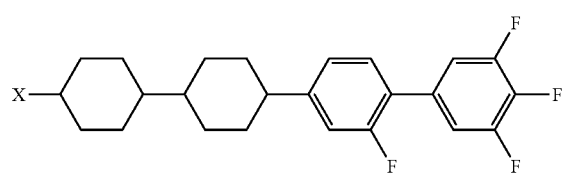

in an amount of approximately 6.5 weight percent,

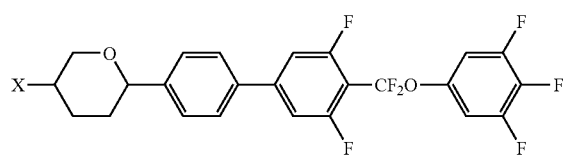

in an amount of approximately 12 weight percent,

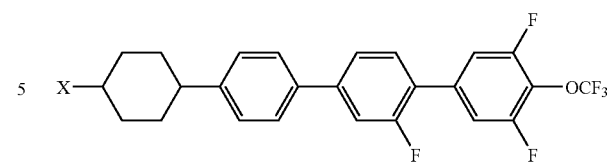

in an amount of approximately 6 weight percent,

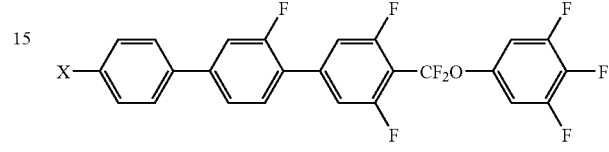

in an amount of approximately 5 weight percent,
the liquid crystal composition III comprises compounds of the formulas

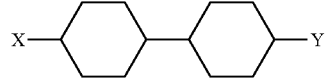

in an amount of approximately 21.5 weight percent,

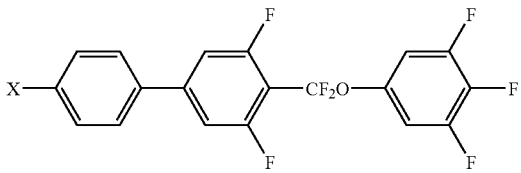

in an amount of approximately 10 weight percent,

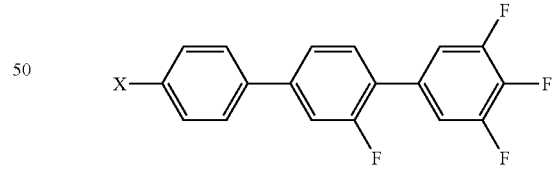

in an amount of approximately 7 weight percent,

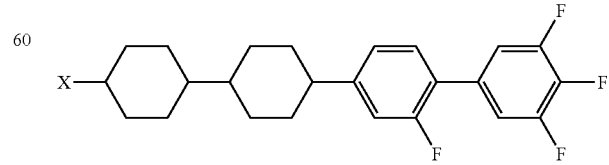

in an amount of approximately 5 weight percent,

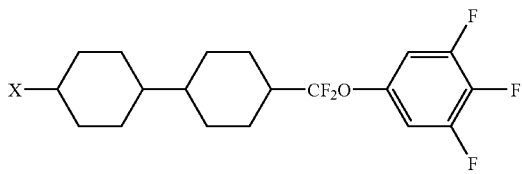

in an amount of approximately 27 weight percent,

in an amount of approximately 10 weight percent,

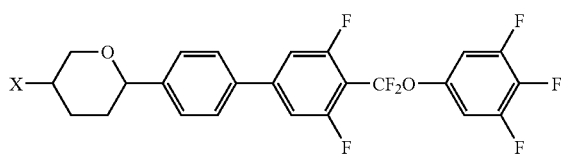

in an amount of approximately 13.5 weight percent,

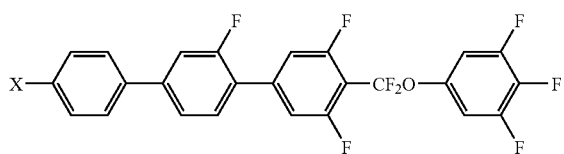

in an amount of approximately 2 weight percent,

in an amount of approximately 4 weight percent, and
the liquid crystal composition IV comprises compounds of the formulas

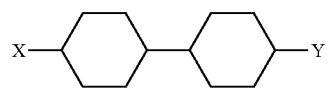

in an amount of approximately 12 weight percent,

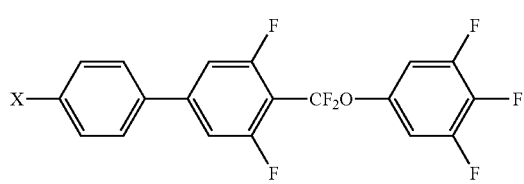

in an amount of approximately 5.5 weight percent,

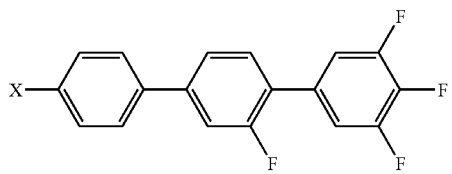

in an amount of approximately 10 weight percent,

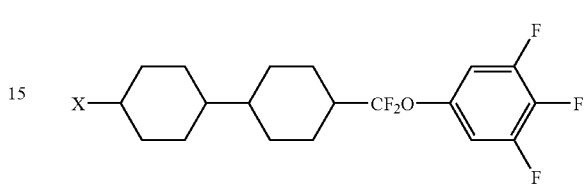

in an amount of approximately 35 weight percent,

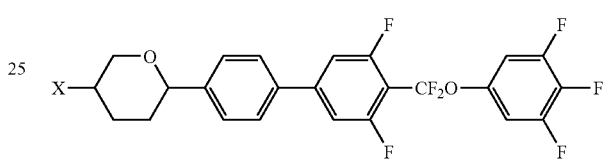

in an amount of approximately 14 weight percent,

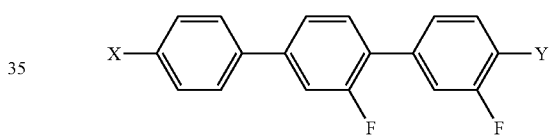

in an amount of approximately 5 weight percent,

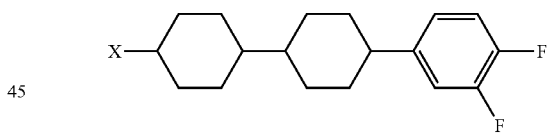

in an amount of approximately 8.5 weight percent,

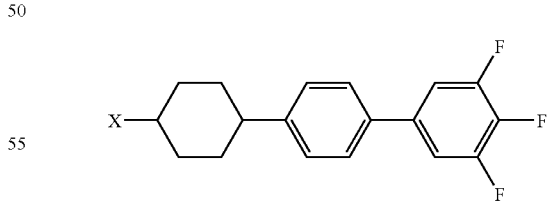

in an amount of approximately 10 weight percent, based on a total weight of the liquid crystal composition, and X and Y may be independently one of an alkyl group, an alkynyl group and an alkoxy group.

In an embodiment, a thickness of the liquid crystal layer may be in a range of approximately 3 micrometers ("μm") to approximately 4 μm. In an embodiment, the thickness of the liquid crystal layer is in a range of approximately 3.3 μm to approximately 3.6 μm.

In an embodiment, an effective elastic coefficient of the liquid crystal layer may be approximately 10 or less. In an embodiment, a pitch of the liquid crystal layer may be approximately 100 or more.

In an embodiment, the liquid crystal display is in a normally white mode, and a final luminance is approximately 10 percent or less for one frame when a voltage difference between both ends of the liquid crystal capacitor is changed from 0 volts ("V") to 2.5 V.

In an embodiment, the liquid crystal layer comprises a liquid crystal composition comprising at least one compound of the formula

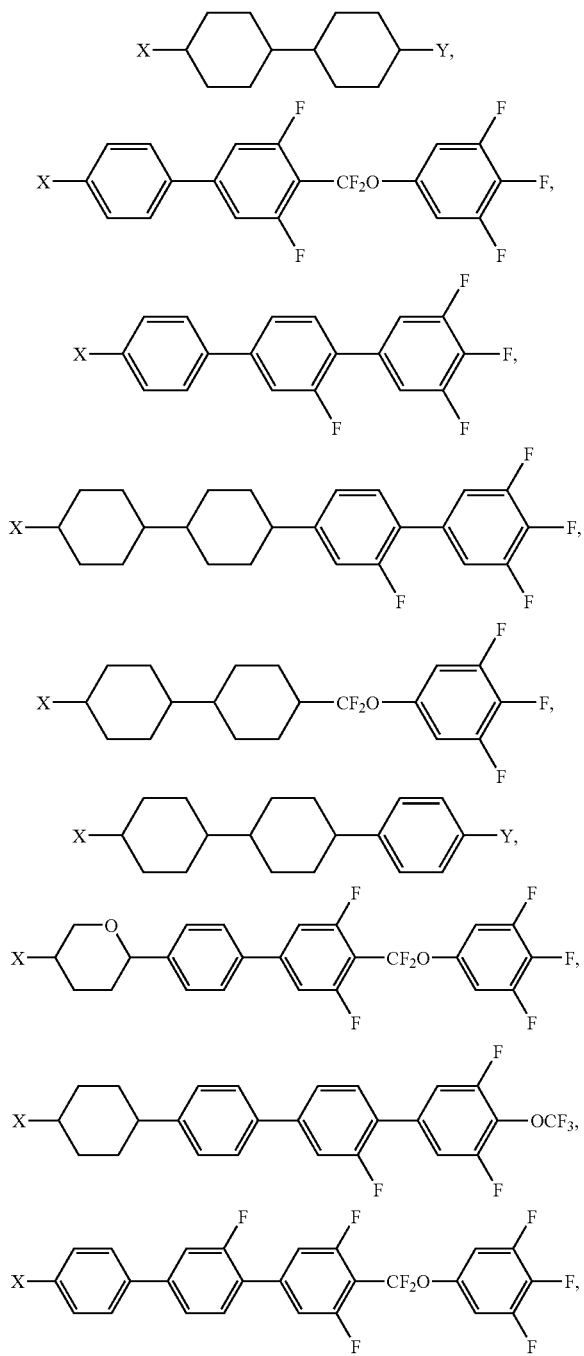

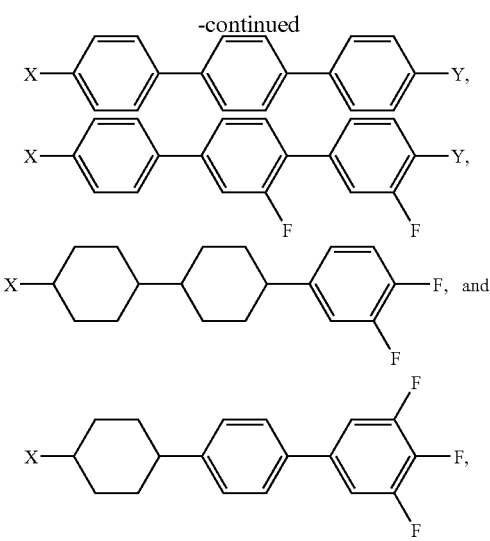

and X and Y may be independently one of an alkyl group, an alkynyl group and an alkoxy group.

The disclosed liquid crystal display can provide excellent image quality at a low driving voltage.

These and other features, aspects, and advantages of the disclosed embodiments will become better understood with reference to the following description and appended claims.

BRIEF DESCRIPTION OF THE DRAWINGS

The disclosed subject matter is particularly pointed out and distinctly claimed in the claims at the conclusion of the specification. The foregoing and other objects, features, and advantages of the disclosed embodiments are apparent from the following detailed description taken in conjunction with the accompanying drawings in which:

Figure 1:
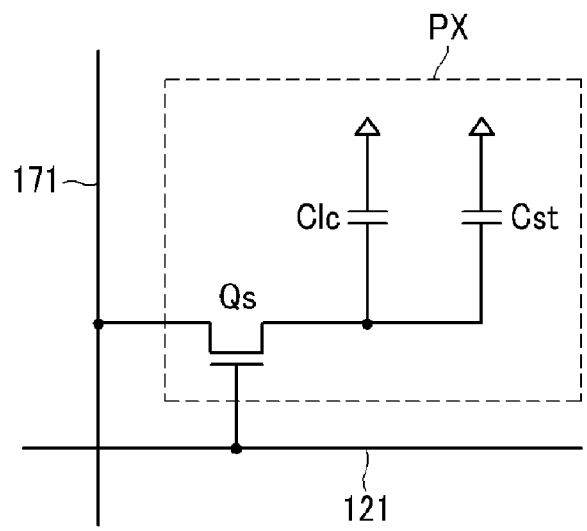
FIG. 1 is an equivalent circuit diagram showing an exemplary embodiment of a pixel in a liquid crystal display.

The detailed description explains the preferred embodiments, together with advantages and features, by way of example with reference to the drawings.

DETAILED DESCRIPTION OF THE INVENTION

The present invention will be described more fully hereinafter with reference to the accompanying drawings, in which exemplary embodiment's of the invention are shown. As those skilled in the art would realize, the described embodiments may be modified in various different ways, all without departing from the spirit or scope of the present invention.

Aspects, advantages, and features of the present invention and methods of accomplishing the same may be understood more readily by reference to the following detailed description of preferred embodiments and the accompanying drawings. The present invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In the drawings, the thickness of layers, films, panels, regions, etc., are exaggerated for clarity. Like reference numerals designate like elements throughout the specification. When an element such as a layer, a film, a region, a plate, or the like is referred to as being "above" another element, the element may be "directly on" another element or there may be an intervening element present therebetween. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, referring to FIG. 1 to FIG. 5, a liquid crystal display according to an exemplary embodiment is described in detail.

Figure 2:
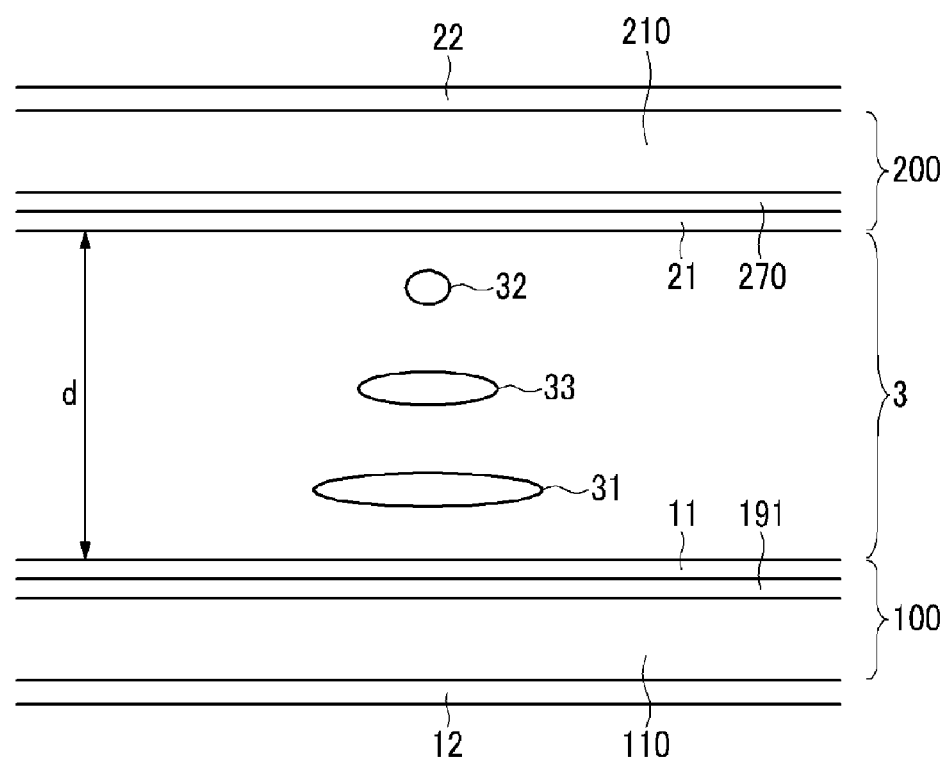
FIGS. 2 and 3 are cross-sectional views showing an exemplary embodiment of a liquid crystal display.
Figure 3:
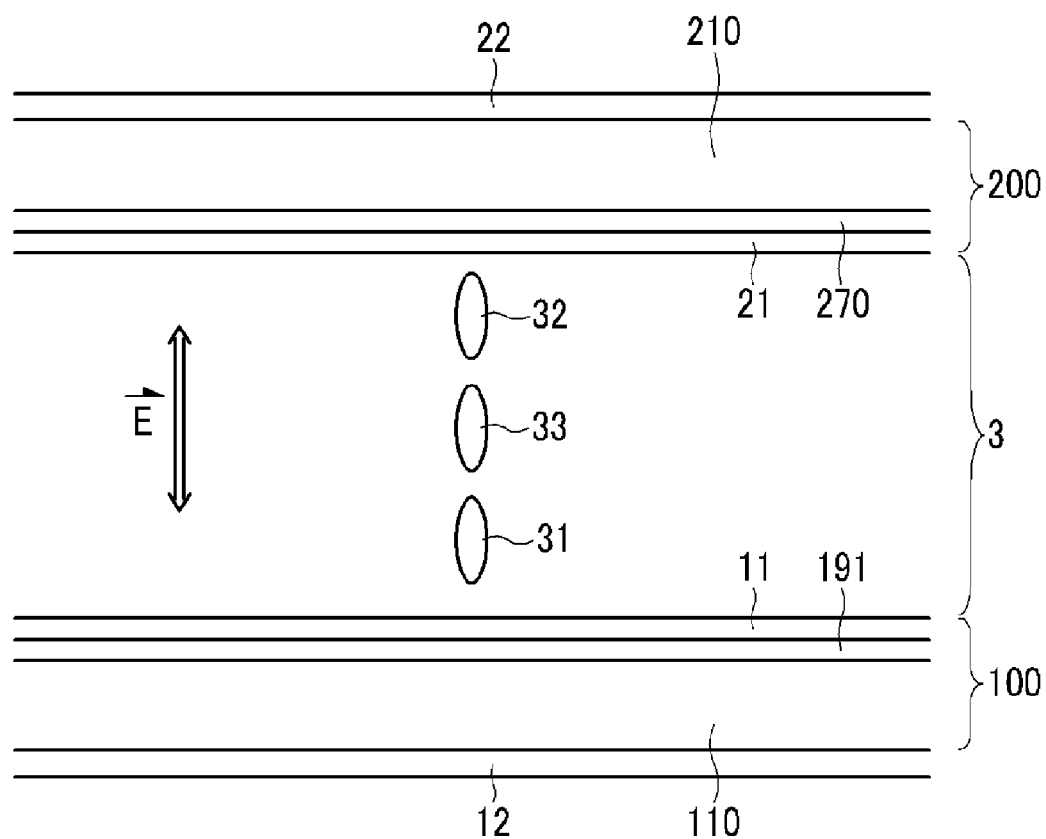
Figure 4:
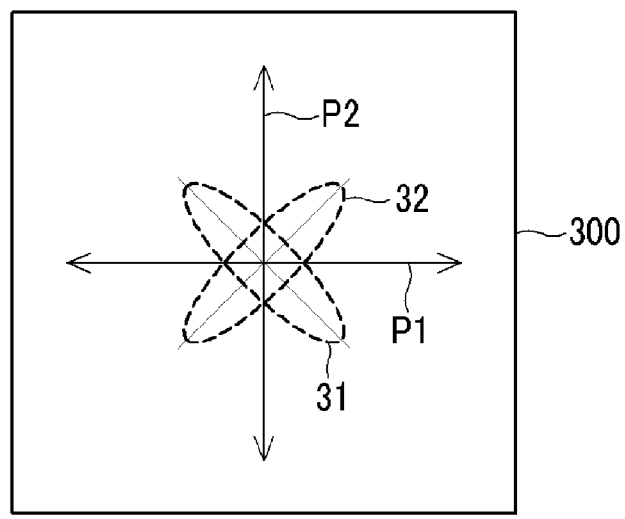
FIGS. 4 and 5 are diagrams illustrating a polarization direction of an exemplary embodiment of a polarizer in an embodiment of a liquid crystal display.
Figure 5:
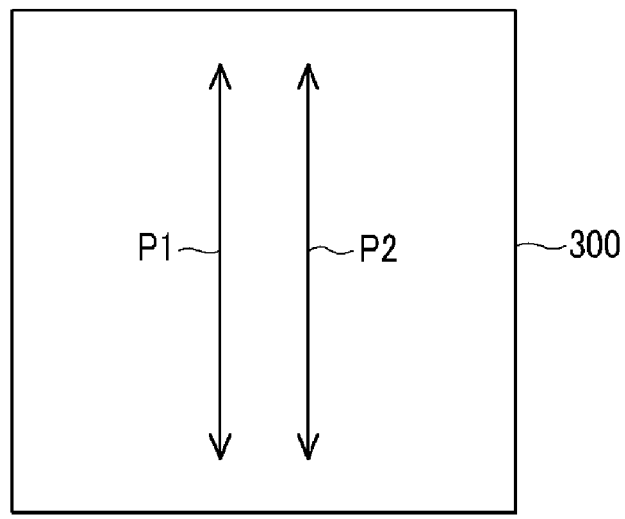

FIG. 1 is an equivalent circuit diagram of an exemplary embodiment of a pixel in a liquid crystal display, FIG. 2 and FIG. 3 are cross-sectional views of an exemplary embodiment of a liquid crystal display, and FIG. 4 and FIG. 5 are diagrams illustrating a polarization direction of a polarizer in an exemplary embodiment of a liquid crystal display.

Referring to FIG. 1, the liquid crystal display includes a plurality of pixels PX, which are disposed approximately in a matrix, and a plurality of gate lines 121 and a plurality of data lines 171, which are connected thereto. The gate lines 121 transmit gate signals and the data lines 171 transmit data voltages. Each of the pixels includes a switching element Qs, and a liquid crystal capacitor Clc and a storage capacitor Cst, which are connected thereto. The switching element Qs controls a data voltage in response to a gate signal. The switching element Qs is activated for a short time to allow the data voltage to be transmitted, and is turned off for a remaining time. The data voltages applied to each of the pixels PX are stored at the liquid crystal capacitor Clc and the storage capacitor Cst. The liquid crystal capacitor Clc includes a liquid crystal material as a dielectric material, and the storage capacitor Cst includes a different insulator.

Referring to FIG. 2 and FIG. 3, the liquid crystal display according to an exemplary embodiment includes a thin film transistor array panel 100 and a common electrode panel 200, which face each other, and a liquid crystal layer 3 interposed between the thin film transistor array panel 100 and the common electrode panel 200. The liquid crystal display further includes a pair of first and second polarizers 12 and 22, disposed in a crossed or parallel configuration, which are disposed on exterior surfaces of the thin film transistor array panel 100 and the common electrode 200, respectively. FIG. 4 illustrates an exemplary embodiment wherein the first and second polarizers 12 and 22 are disposed in a crossed configuration, and FIG. 5 illustrates an exemplary embodiment wherein the first and second polarizers 12 and 22 are disposed in a parallel configuration in a liquid crystal display 300.

The thin film transistor array panel 100 includes a first substrate 110, pixel electrodes 191, and a first homogeneous alignment layer 11, which are disposed on an interior surface of the first substrate 110. The common electrode panel 200 includes a second substrate 210, and a common electrode 270 and a second homogeneous alignment layer 21, which are disposed on an interior surface of the second substrate 210. Liquid crystal capacitors Clc comprise pixel electrodes 191, the common electrode 270, and the liquid crystal layer 3 interposed therebetween. A selected voltage, which can be a common voltage, is applied to the common electrode 270, and data voltages transmitted through the switching elements Q are applied to the pixel electrodes 191. The pixel electrodes 191 may also form storage capacitors Cst by being superimposed with another conductor (not shown) of the thin film transistor array panel 100.

The liquid crystal layer 3 has positive dielectric anisotropy and is disposed in a twisted nematic ("TN") mode. In an embodiment, when a voltage is not applied, long axes of the liquid crystal molecules 31, 32, and 33 are parallel to surfaces of the first and second substrates 110 and 210, respectively, and the long axes gradually twist from a surface of one of the first and second homogeneous alignment layers 11 and 21 to a surface of the other of the first and second homogeneous alignment layers 21 and 1. In this state, the long axes of the liquid crystal molecules 31 and 32 near the surfaces of the first and second homogeneous alignment layers 1 and 21 may each form an angle of approximately 45 degrees with polarization axes of the first and second polarizers 12 and 22, as shown in FIG. 4.

When a potential difference is applied between the pixel electrodes 191 and the common electrode 270 in the liquid crystal display, an electric field E, which is substantially perpendicular to the surfaces of the first and second substrates 110 and 210, is generated as shown in FIG. 3. As a result, the liquid crystal molecules 31 to 33 are arranged so that the long axes are parallel to the electric field E. When the intensity of the electric field E is large enough, the long axes of most of the liquid crystal molecules 31 to 33 may be substantially parallel to the electric field E.

Light passing through any one of the first and second polarizers 12 and 22 is linearly polarized according to polarization axes P1 and P2, respectively, and a polarization of the light is changed when the light passes through the liquid crystal layer 3. The incident light, having passed through the liquid crystal layer 3, is again linearly polarized by the other of the polarizers 22 and 12. Thus, in an embodiment, the intensity of outgoing light depends on a degree of polarization change by the liquid crystal layer 3. The degree of polarization change of light, which passes through the liquid crystal layer 3, depends on an arrangement of the liquid crystal molecules 31 to 33. In an embodiment, as shown in FIG. 3, when most of the liquid crystal molecules 31 to 33 are perpendicular to the surfaces of the first and second substrates 110 and 210, there is little polarization change of the light passing through the liquid crystal layer 3. Accordingly, when the first and second polarizers 12 and 22 are crossed, as shown in FIG. 4, transmission of incident light is prevented, and when the first and second polarizers 12 and 22 are parallel, as shown in FIG. 5, the incident light is substantially transmitted. In an embodiment, as shown in FIG. 2, when an electric field is not applied across the liquid crystal layer 3, thus the liquid crystal molecules 31 to 33 are substantially parallel to the surfaces of the first and second substrates 110 and 210 and are maximally twisted, there occurs the largest polarization change of light passing through the liquid crystal layer 3. Accordingly, when the first and second polarizers 12 and 22 are crossed, as shown in FIG. 4, the incident light can pass, and when the first and second polarizers 12 and 22 are parallel, as shown in FIG. 5, transmission of the incident light is prevented. Therefore, the embodiment shown in FIG. 4 is called a normally white mode, and the embodiment shown in FIG. 5 is called a normally black mode.

The arrangement of the liquid crystal molecules 31 to 33 is controlled by the intensity of the electric field E, and the intensity of the electric field E is controlled by a difference in voltage between the pixel electrodes 191 and the common electrode 270. Therefore, it is possible to control an intensity of outgoing light by varying the data voltage applied to the pixel electrodes 191, and thus, it is possible to control a luminance of the pixels PX.

In a liquid crystal display the common voltage may be approximately 2.5 volts ("V") and the data voltage may vary in a range of approximately 0 V to approximately 5 V, specifically between approximately 0.25 V to approximately 7 V, more specifically between approximately 0.5 V to approximately 6V. In an embodiment, when a data voltage of 2.5 V is applied for a sufficient time, an arrangement the liquid crystal molecules is like that of FIG. 2, and a maximum luminance may be displayed by configuring the polarizers in a crossed configuration, and a minimum luminance may be displayed by configuring the polarizers in a parallel configuration. In another embodiment, when a data voltage of approximately 0 V or approximately 5 V is applied for a sufficient time, a minimum luminance may be displayed by configuring the polarizers in crossed configuration, and a maximum luminance may be displayed by configuring the polarizers in a parallel configuration, as shown in FIG. 3.

A ratio of a capacitance of the storage capacitor Cst to a capacitance of the liquid crystal capacitor Clc, Cst/Clc (hereinafter, the ratio Cst/Clc is referred to as a capacitance ratio, and the capacitor and the capacitance thereof will be represented by the same reference numeral), is approximately 0.2 or more, specifically approximately 0.4 or more, more specifically approximately 0.6 or more. The capacitance ratio may be about 0.7 or less, and when the capacitance ratio is over 0.7, the aperture ratio may be substantially reduced, hindering display of an image. The dielectric anisotropy of the liquid crystal layer 3 may be approximately 10 or more, specifically approximately 14 or more, more specifically 16 or more. In an embodiment, the dielectric anisotropy may be in a range of approximately 15 to approximately 18. Furthermore, the dielectric anisotropy may be in a range of approximately 15.1 to approximately 17.3. A thickness d of the liquid crystal layer, also termed a cell gap, is between approximately 3.0 micrometers "μm" to approximately 4.0 μm, specifically between approximately 3.3 μm to approximately 3.6 μm. An effective elastic coefficient Keff of the liquid crystal layer 3 may be approximately 15 or less, specifically approximately 10 or less, and a pitch of the liquid crystal layer 3 may be approximately 50 or more, specifically approximately 100 or more.

Exemplary embodiments of the liquid crystal display shown in FIG. 1 to FIG. 5 are described in detail with reference to FIG. 6 and FIG. 7.

Figure 6:
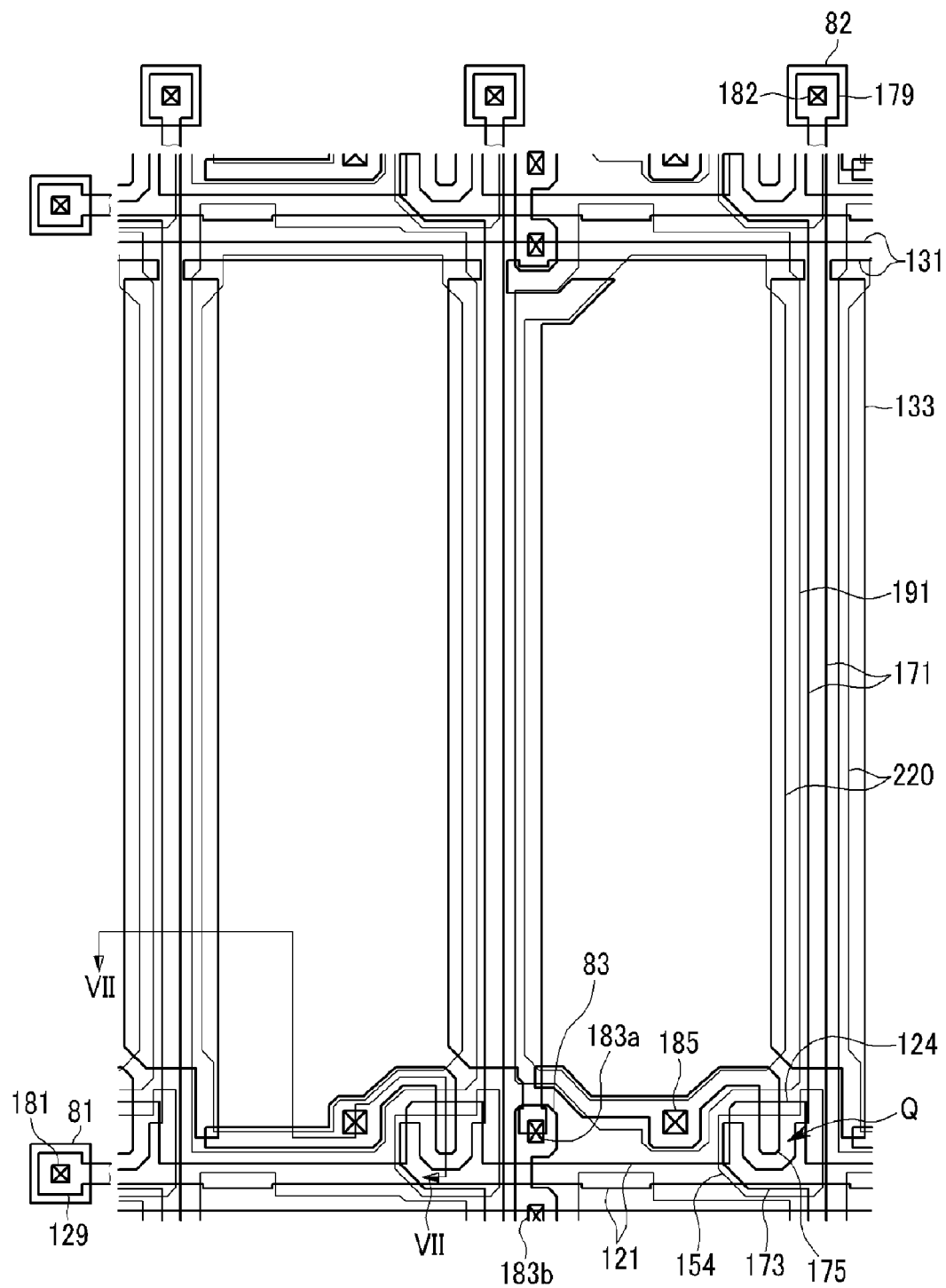
FIG. 6 is a plan view showing an exemplary embodiment of a liquid crystal display.
Figure 7:
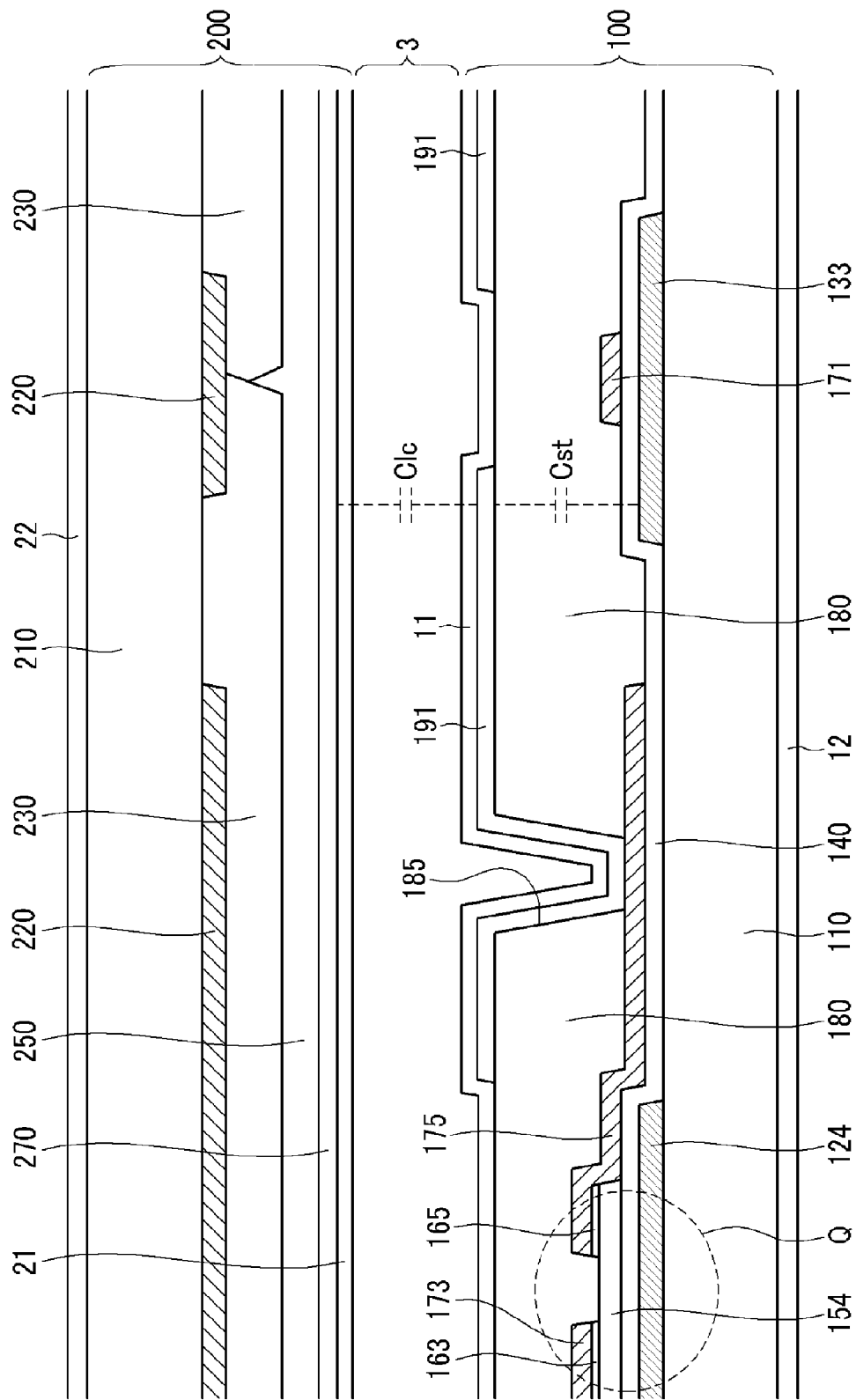
FIG. 7 is a cross-sectional view showing an exemplary embodiment of a liquid crystal display taken along line of FIG. 6.

FIG. 6 is a plan view showing an exemplary embodiment of a liquid crystal display, and FIG. 7 is a cross-sectional view showing an exemplary embodiment of a liquid crystal display taken along line VII-VII of FIG. 6.

Referring to FIG. 6 and FIG. 7, the liquid crystal display includes a thin film transistor array panel 100, a common electrode panel 200, a liquid crystal layer 3, and first and second polarizers 12 and 22.

First, the common electrode panel 200 is described.

A light blocking member 220 is disposed on a second substrate 210, which may comprise transparent glass, plastic, or the like, or a combination comprising at least one of the foregoing materials. The light blocking member 220 is also referred to as a black matrix and has a plurality of openings, which are arranged in a matrix.

A plurality of color filters 230 are also disposed on the second substrate 210. A portion of the color filters 230 are disposed in the openings and may be disposed along a column of the openings of the light blocking member 220 in a vertical direction. Each of the color filters 230 may have one of three primary colors, e.g., red, green, and blue. Adjacent color filters 230 may be superimposed over each other.

An overcoat 250 is disposed on the color filters 230 and the light blocking member 220. The overcoat 250 may comprise an organic insulator, or the like. The overcoat 250 can substantially reduce or prevent exposure of the color filter 230 and can provide a flat surface. The overcoat 250 may be omitted.

The common electrode 270 is disposed on the overcoat 250. The common electrode 270 may comprise a transparent conductor, such as indium tin oxide ("ITO"), indium zinc oxide ("IZO"), or the like, or a combination comprising at least one of the foregoing materials.

The second homogeneous alignment layer 21 is disposed on the common electrode 270. The second homogeneous alignment layer 21 may be a homogenous alignment layer, and may be rubbed in one direction.

Next, the thin film transistor array panel 100 is described.

Gate lines 121 and storage electrode lines 131 are disposed on a second substrate 110, which may comprise transparent glass, plastic, or the like, or a combination comprising at least one of the foregoing materials.

The gate lines 121 transmit gate signals and extend mainly in a horizontal direction. Each of the gate lines 121 includes a plurality of gate electrodes 124, which project upwards, and a gate line end portion 129 for electrical connection with another layer or an external driving circuit. A gate driving circuit (not shown) generates gate signals and may be mounted on a flexible printed circuit film (not shown) attached onto the second substrate 110, may be mounted directly on the second substrate 110, or integrated on the second substrate 110. In an embodiment where the gate driving circuit is integrated on the second substrate 110, the gate lines 121 may extend to and be electrically connected directly to the gate driving circuit.

A selected voltage is applied to the storage electrode lines 131. The storage electrode lines 131 each include a branch line extending substantially parallel to the gate lines 121, and a plurality of storage electrodes 133 branching from the branch line. The storage electrode lines 131 are disposed between adjacent gate lines 121 and the branch line is closer to upper portions of the gate lines 121 and between two of the gate lines 121. The storage electrodes 133 each include a fixed end electrically connected to the branch line, a free end opposite thereto, and a main body therebetween. The fixed end and the free end have widths which are smaller than a width of the main body. The fixed end is electrically connected to the center of the main body and the free end is electrically connected to any one side of the main body. Upper-right portions of the main body of the storage electrodes 133 have a shape which is different than a shape of other portions of storage electrodes 133. The portions of the storage electrodes 133 disposed in the center of FIG. 6 protrude to the right side in FIG. 6, and the portions of the storage electrodes 133 shown at either side of FIG. 6 are flat. In other embodiments, the storage electrode lines 131 may have various shapes and various arrangement patterns.

A gate insulating layer 140, which may comprise silicon nitride ($SiN_x$), silicon oxide ($SiO_x$), or the like, or a combination comprising at least one of the foregoing materials is disposed on the gate lines 121 and the storage electrode lines 131.

Semiconductor islands 154, which may comprise hydrogenated amorphous silicon ("a-Si"), polysilicon, or the like, or a combination comprising at least one of the foregoing materials, are disposed on the gate insulating layer 140. The semiconductor islands 154 are disposed on the gate electrodes 124, and an upper right portion of each of the semiconductor islands 154 can protrude slightly.

A pair of first and second ohmic contacts 163 and 165 are disposed on the semiconductor islands 154. The first and second ohmic contacts 163 and 165 may comprise a material such as n+ hydrogenated amorphous silicon doped with an n-type impurity at high concentration, silicide, or the like, or a combination comprising at least one of the foregoing materials.

Data lines 171 and drain electrodes 175 are disposed on the first and second ohmic contacts 163 and 165, respectively, and on the gate insulating layer 140.

The data lines 171 extend mainly in a vertical direction and intersect the gate lines 121 near the gate electrodes 124, respectively. The data lines 171 also intersect the storage electrode lines 131 and are superimposed on the storage electrodes 133. The data lines 171 each include a source electrode 173, which have a 'J' shape and are disposed on the gate electrodes 124, and a data line end portion 179 for electrically connecting with another layer or an external driving circuit. A data driving circuit (not shown) generates the data voltages and may be mounted on the flexible printed circuit film (not shown), which is attached to the first substrate 110, may be mounted directly on the first substrate 110, or may be integrated on the first substrate 110. In an embodiment the data driving circuit is integrated on the first substrate 110 and the data lines 171 may extend to and be electrically connected directly to the data driving circuit.

The drain electrodes 175 extend upward from one end, are partially surrounded by the source electrodes 173, and are bent and elongated in the horizontal direction. Further, the drain electrodes have a part having a large area in the middle thereof. The drain electrodes 175 can comprise two different shapes which are each disposed on every other of the drain electrodes 175, and a portion of the drain electrodes 175 corresponding to the protruding upper-right corner of each of the storage electrodes 133 also protrudes upwards.

One of each of the gate electrodes 124, the source electrodes 173, the drain electrodes 175, and the semiconductor islands 154 constitute a thin film transistor ("TFT"), which is a switching element Q shown in FIG. 1. A channel of the thin film transistor is disposed on each of the semiconductor islands 154 between each of the source electrodes 173 and the drain electrodes 175.

The first and second ohmic contacts 163 and 165 are disposed only between the underlying semiconductor islands 154 and the overlying data lines 171 and the drain electrodes 175, and reduce a contact resistance therebetween. The semiconductor islands 154 each include an exposed portion not covered by the data lines 171 and the drain electrodes 175, such as a portion between the source electrodes 173 and the drain electrodes 175.

A passivation layer 180 is disposed on the data lines 171, the drain electrodes 175, and the exposed portions of the semiconductor islands 154. The passivation layer 180 may comprise an inorganic insulator, an organic insulator, or the like, or a combination comprising at least one of the foregoing insulators, and may have a flat surface. The inorganic insulator may include silicon nitride, silicon oxide, or the like, or a combination comprising at least one of the foregoing materials. The organic insulator may be photosensitive. The dielectric constant of the organic insulator may be approximately 2 or less, specifically approximately 4 or less, more specifically approximately 6 or less. In an embodiment, the passivation layer 180 may have a dual-layer structure composed of a lower inorganic layer and an upper organic layer to reduce or substantially prevent the exposed portions of the semiconductor islands 154 from being damaged without significantly altering the properties of the organic layer.

First contact holes 182, which expose the data line end portions 179 of the data lines 171, and second contact holes 185, which expose the wide portions of the drain electrodes 175, are disposed in the passivation layer 180. Third contact holes 181, which expose the gate line end portions 129 of the gate lines 171, and fourth contact holes 183b, which expose a part of the branch line of each of the storage electrode lines 131 located near the fixed end of the storage electrodes 133, and a fifth contact holes 183a, which expose the free end of the storage electrodes 133, are disposed in the passivation layer 180 and the gate insulating layer 140. The fourth and fifth contact holes 183a and 183b are disposed at the protruding upper-right corner of each of the storage electrodes 133 and the upwardly-protruding portions of the drain electrodes 175.

Pixel electrodes 191, overpasses 83, and first and second contact assistants 81 and 82 are disposed on the passivation layer 180. They may comprise a transparent conductive material, such as ITO or IZO, or a reflective metal such as aluminum, silver, chromium, an alloy thereof, or the like, or a combination comprising at least one of the foregoing materials.

The pixel electrodes 191 are physically and electrically connected to the drain electrodes 175 through the second contact holes 185 and data voltages from the drain electrodes 175 are applied to the pixel electrodes 191. The pixel electrodes 191 are superimposed on the common electrode 270, and the liquid crystal layer 3 is interposed therebetween to constitute liquid crystal capacitors Clc, while the pixel electrodes 191 are superimposed on the storage electrode lines 131 as well as the storage electrodes 133 to constitute storage capacitors Cst. The capacitance of the storage capacitors Cst can be selected by selecting the superimposing area of the pixel electrodes 191 and the storage electrode lines 131. When the superimposing area is increased to increase the capacitance, an opening ratio may be reduced.

The pixel electrodes 191 face an opening of the light blocking member 220. The drain electrodes 175 are superimposed on the pixel electrodes 191 along a bottom side of the pixel electrodes 191.

The overpasses 83 intersect the gate lines 121 and are electrically connected to an exposed edge of a free end of the storage electrodes 133 and an exposed portion of the branch line of each of the storage electrode lines 131 through the contact holes 183a and 183b, which are disposed opposite to each other with respect to the gate lines 121. One overpass 83 can be disposed per every two pixels in a row direction. The pixel electrodes 191, the drain electrodes 175, the storage electrodes 133, and the light blocking member 220 may have different shapes according to whether the optional overpasses 83 are present. In an embodiment, when the overpasses 83 are present, a large portion of the corner of each of the pixel electrodes 191 is cut off, and thus the shapes of the pixel electrodes 191, the drain electrodes 175, the storage electrodes 133, and the light blocking member 220 are changed accordingly. The storage electrode lines 131, including the storage electrodes 133, together with the overpasses 83, may be used to correct a defect of the gate lines 121, the data lines 171, or a thin film transistor.

A capacitance ratio, which is a capacitance of the storage capacitor Cst to a capacitance of the liquid crystal capacitor Clc, may be approximately 0.2 or more, specifically 0.4 or more, more specifically 0.6 or more. The capacitance ratio may be approximately 0.7 or less. When the capacitance ratio is greater than 0.7, an aperture ratio is decreased, thereby interrupting display of an image. The dielectric anisotropy of the liquid crystal layer 3 may be approximately 14 or more. In particular, the dielectric anisotropy of the liquid crystal layer 3 may be in a range of approximately 14 to approximately 15. Furthermore, the dielectric anisotropy of the liquid crystal layer 3 may be in a range of approximately 15.1 to approximately 17.3. The thickness d of the liquid crystal layer, which is a cell gap, may be approximately 3.0 μm to approximately 4.0 μm, specifically approximately 3.3 μm to approximately 3.6 μm, more specifically approximately 3.5 μm. An effective elastic coefficient Keff of the liquid crystal layer 3 may be approximately 10 or less, and a pitch of the liquid crystal layer 3 may be approximately 100 or more.

In a liquid crystal display according to an exemplary embodiment, the common voltage may be approximately 2.5V and the data voltage may vary in a range of approximately 0V to 5V.

The above-described conditions have been observed in experimental examples described below with reference to FIG. 8A to FIG. 16C. Each of FIG. 8A to FIG. 9C, and FIG. 11A to FIG. 16C illustrates a curve representing a luminance of a pixel with respect to time when the data voltage is selected to be 0 V, 2.5 V, or 5 V in a normally white mode liquid crystal display. In the experiments, a data voltage of 2.5 V was applied for several frames at a state of 0 V, and then a data voltage of 5 V was applied for several frames. The driving frequency was 60 hertz ("Hz"). The resolution of the liquid crystal display was 1280 by 800 pixels.

In the experiments, five liquid crystal compositions, A to E, were used. The five liquid crystal compositions A to E comprised at least one of the compounds listed in Table 1 in the amounts listed in Table 1, which are in weight percent, based on the total weight of the liquid crystal composition.

TABLE 1

| Compound | Formula | Liquid Crystal ("LC") Composition ||||| 
| | | A | B | C | D | E |
|---|---|---|---|---|---|---|
| 1 | X—[Cy]—[Cy]—Y | 31.5 | 41 | 42 | 21.5 | 12 |
| 2 | X—[Ph]—[Ph(F,F)]—CF$_2$O—[Ph(F,F)]—F | 15 | 13 | 12.5 | 10 | 5.5 |
| 3 | X—[Ph]—[Ph(F)]—[Ph(F,F,F)] | 10 | 8.5 | 10.5 | 7 | 10 |
| 4 | X—[Cy]—[Cy]—[Ph(F)]—[Ph(F,F,F)] | 7 | 6.5 | 7 | 5 | — |
| 5 | X—[Cy]—[Cy]—CF$_2$O—[Ph(F,F,F)] | 18.5 | — | 3.5 | 27 | 35 |
| 6 | X—[Cy]—[Cy]—[Ph]—Y | — | — | 6.5 | 10 | — |
| 7 | X—[Pyran]—[Ph]—[Ph(F,F)]—CF$_2$O—[Ph(F,F)]—F | 12 | 12 | 10 | 13.5 | 14 |
| 8 | X—[Pyran]—[Cy]—CF$_2$O—[Ph(F,F,F)] | — | 8 | — | — | — |
| 9 | X—[Ph]—[Ph]—[Ph(F)]—[Ph(F,F)]—OCF$_3$ | — | 6 | — | — | — |

TABLE 1-continued

| | | Liquid Crystal ("LC") Composition | | | | |
|---|---|---|---|---|---|---|
| Compound | Formula | A | B | C | D | E |
| 10 | [structure with fluorinated biphenyl-CF₂O-phenyl] | 6 | 5 | 8 | 2 | — |
| 11 | X—[phenyl]—[phenyl]—[phenyl]—Y | — | — | — | 4 | — |
| 12 | X—[phenyl]—[phenyl-F]—[phenyl-F]—Y | — | — | — | — | 5 |
| 13 | X—[cyclohexyl]—[cyclohexyl]—[phenyl-F,F] | — | — | — | — | 8.5 |
| 14 | X—[cyclohexyl]—[phenyl]—[phenyl-F,F,F] | — | — | — | — | 10.0 |

In an embodiment, X and Y may be independently one of an alkyl group, an alkynyl group, an alkoxy group, and the like.

Figure 11A:
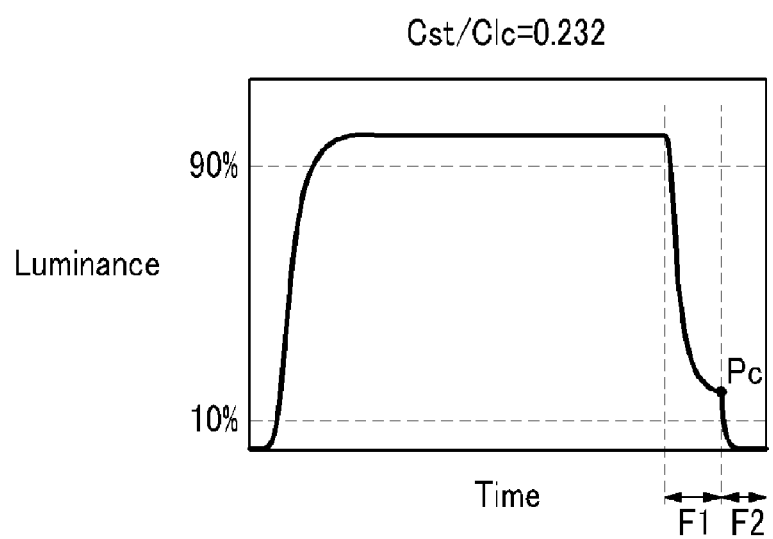
FIG. 11A to FIG. 16C are graphs illustrating the luminance of an exemplary embodiment of a liquid crystal display with respect to time.

As shown in FIG. 11A, in a first frame F1 in which the data voltage is changed from 2.5 V to 5 V, the luminance is not less than 10 percent ("%"). However, not until the second frame F2 is the luminance decreased to the minimum value.

In the first frame F1, the luminance rapidly decreases, but the rate of decrease is gradually reduced, and at the end of frame F1, the luminance stays at a point over 10%. If a data voltage is no longer applied, the luminance is maintained in the last state. More specifically, since the response speed of the liquid crystal layer 3 is low, it takes a time for complete rearrangement of the liquid crystal molecules 31 to 33 in response to the intensity change of the electric field when the intensity of the electric field varies rapidly. However, a time while a data voltage is applied to a liquid crystal capacitor Clc can be too short to complete such a rearrangement. Therefore, even after the application of a data voltage is terminated and the voltage of the pixel electrodes 191, which are each one terminal of each of the liquid crystal capacitors Clc and the storage capacitors Cst, are floated, the liquid crystal molecules 31 to 33 are still in a rearrangement process. The dielectric constant of the liquid crystal layer 3 varies in accordance with the rearrangement of the liquid crystal molecules 31 to 33, and accordingly, the voltage of the pixel electrodes 191 varies and a voltage across the liquid crystal capacitors Clc also varies. Consequently, even after the rearrangement of the liquid crystal molecules 31 to 33 is complete, the luminance does not reach the desired value.

In the second frame F2, when the same data voltage as the first frame F1 is applied, the luminance of the pixel decreases rapidly to obtain a minimum luminance, as desired.

Therefore, a pointed cusp Pc is generated in a luminance curve.

Surprisingly, it has been observed that the pointed cusp Pc can be located below a luminance of 10% by selection of a response time of approximately 16 milliseconds ("ms") or less. In addition, it has been observed that the capacitance ratio influences the location of the pointed cusp Pc.

First, the dielectric anisotropy of the liquid crystal layer 3 is selected to be high so the liquid crystal display can be driven at a low voltage, as small as approximately 2.5 V, thus selection of a liquid crystal material having high dielectric anisotropy can be desirable. The dielectric anisotropy of the liquid crystal composition A is 17.3, and the rotational viscosity of the liquid crystal composition A is 103. In a condition in which the capacitance ratio is set to approximately 0.4, the response time and the luminance were measured while the thickness d (refer to FIG. 3) of the liquid crystal layer 3, i.e., the cell gap, was varied.

Figure 8A:
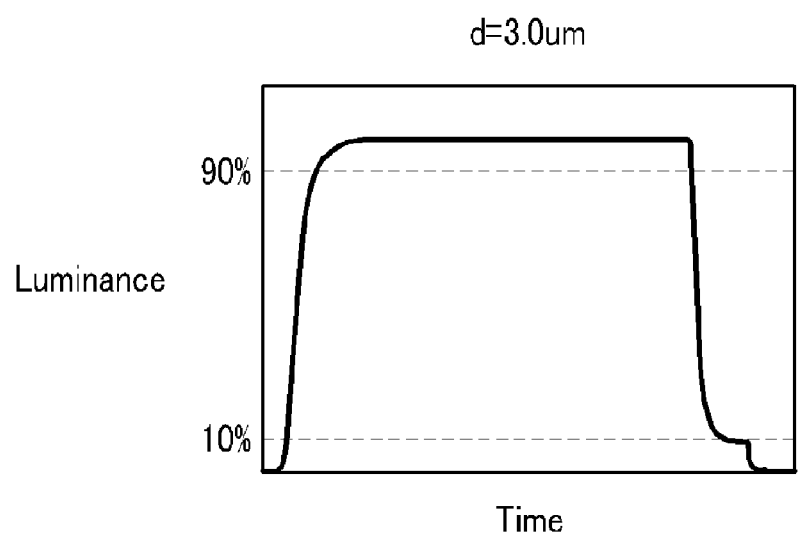
FIG. 8A to FIG. 9C are graphs illustrating the luminance of an exemplary embodiment of a liquid crystal display with respect to time.
Figure 8B:
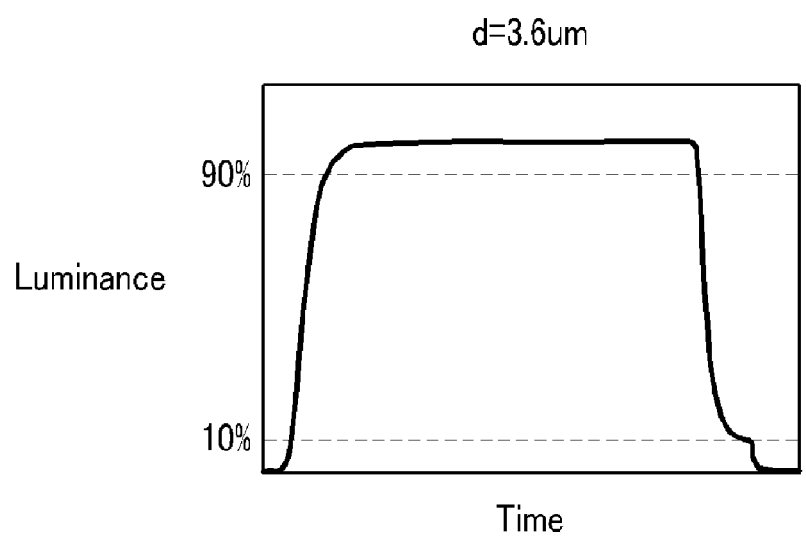
Figure 8C:
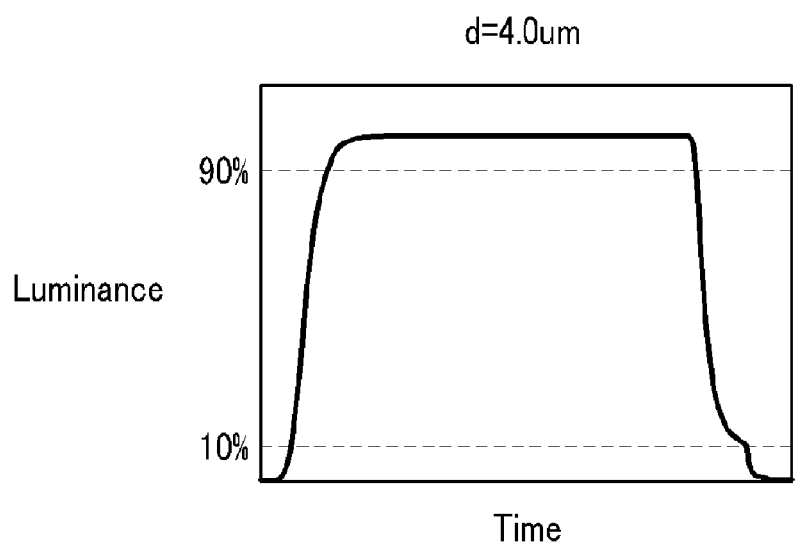

Table 2 shows the response time and the pointed cusp position in exemplary embodiments in which the cell gap is 3.0 μm, 3.3 μm, and 4.0 μm, respectively. FIG. 8A, FIG. 8B, and FIG. 8C show the luminance in exemplary embodiments in which the cell gap is 3.0 μm, 3.6 μm, and 4.0 μm, respectively.

TABLE 2

| Cell Gap | Response time (ms) | | | Cusp position (%) |
| --- | --- | --- | --- | --- |
| | Tr | Tf | Tt | |
| 3.0 | 9.08 | 8.18 | 17.26 | 8.88 |
| 3.3 | 10.66 | 9.07 | 19.73 | 8.95 |
| 3.6 | 12.59 | 9.67 | 22.26 | 10.00 |
| 4.0 | 14.2 | 10.19 | 24.39 | 10.97 |

Herein, Tr, Tf, and Tt represent a rising time, a falling time, and a total time, which is a sum of the rising time and the falling time, respectively.

As shown in Table 2 and FIG. 8A to FIG. 8C, as the cell gap is reduced, the cusp position is lowered, and in an embodiment in which the cell gap is approximately 3.6 μm or less, the cusp Pc is located at a luminance of equal to or less than 10%. In all embodiments in which the cell gap is approximately 3.0 μm or more, the response time was observed to exceed approximately 17 ms.

Next, in an exemplary embodiment in which the cell gap is fixed at 3.6 μm, the response time and the luminance were measured while varying the liquid crystal material and the capacitance ratio. The liquid crystal composition B and the liquid crystal composition C were selected as the liquid crystal material, in addition to the above-described liquid crystal composition A. The dielectric anisotropy and the rotational viscosity of the liquid crystal composition B are 15.1 and 89, respectively. The dielectric anisotropy and the rotational viscosity of the liquid crystal composition C are 12.9 and 76, respectively.

Figure 9A:
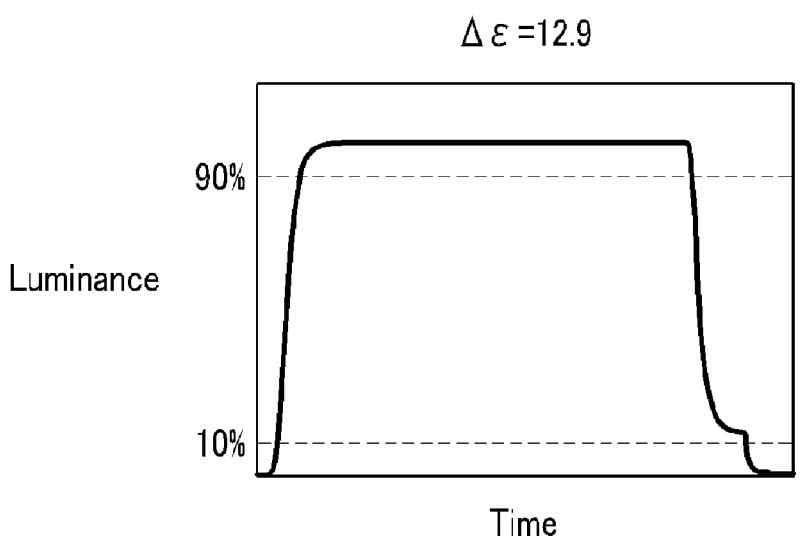
Figure 9B:
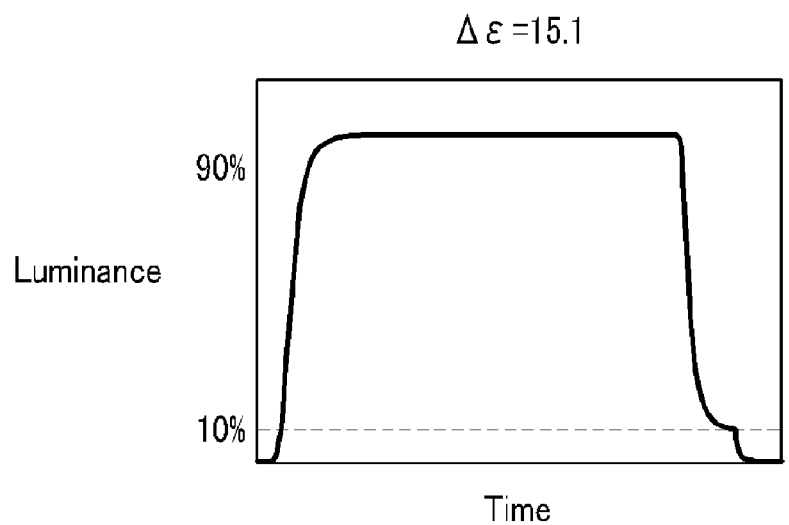
Figure 9C:
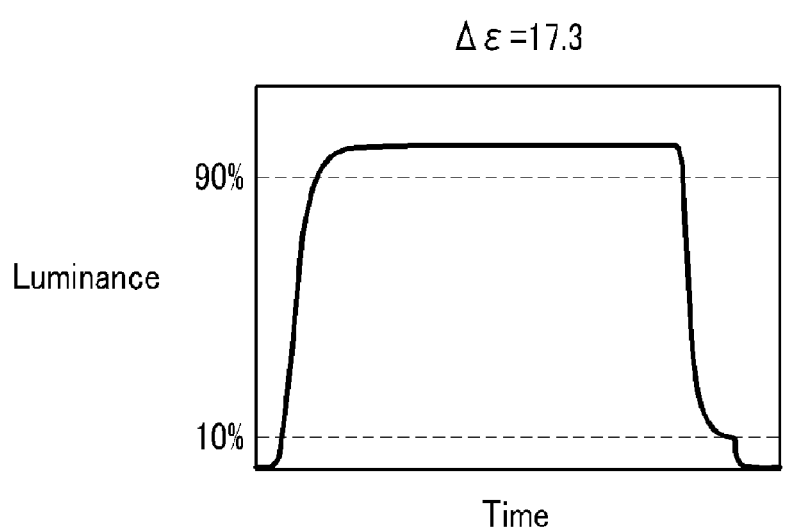

Table 3 illustrates the response time and the cusp position measured when varying the capacitance ratios in liquid crystal displays comprising the liquid crystal compositions A, B, and C. FIG. 9A, FIG. 9B, and FIG. 9C illustrate luminances of the liquid crystal displays comprising the liquid crystal compositions C, B, and A, respectively, in a state in which the capacitance ratio is fixed to 0.5.

TABLE 3

| LC Composition | Capacitance Ratio | Response time (ms) | | | Cusp position (%) |
| --- | --- | --- | --- | --- | --- |
| | | Tr | Tf | Tt | |
| C | 0.51 | 15.05 | 6.32 | 21.37 | 13.1 |
| B | 0.45 | 14.94 | 7.96 | 22.9 | 10.0 |
| A | 0.4 | 12.59 | 9.67 | 22.26 | 10.00 |

As shown in Table 3 and FIG. 9A to FIG. 9C, as the dielectric anisotropy is lowered, the cusp position is raised. In Table 3, it can be observed that there is almost no change in the total response time Tt since the falling time Tf becomes short while the rising time Tr becomes long as the dielectric constant is lowered.

Figure 10:
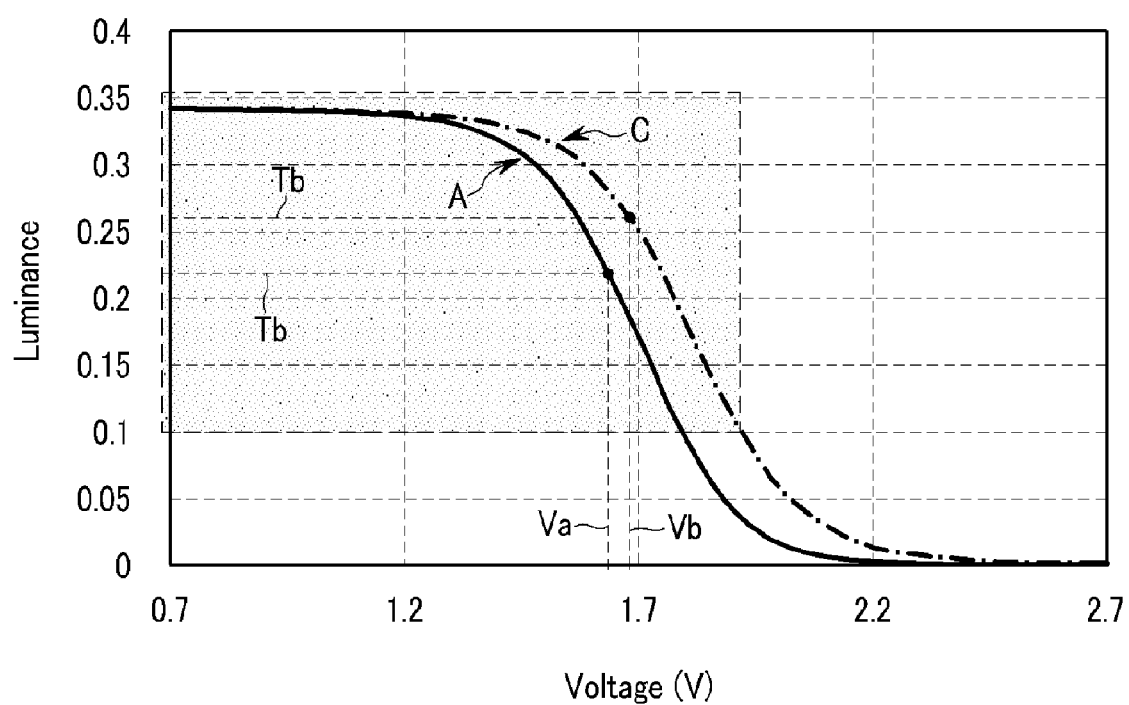
FIG. 10 is a graph illustrating luminance with respect to voltage for an exemplary embodiment of a liquid crystal display.

FIG. 10 illustrates voltage-luminance curves for liquid crystal displays comprising the liquid crystal composition A and the liquid crystal composition C. The luminance curve for the liquid crystal display comprising the liquid crystal composition A, having a high dielectric constant, has a steeper slope than that for the liquid crystal display comprising the liquid crystal composition C. The luminance and the voltage of a pixel at the cusp position for the liquid crystal A is lower than for the liquid crystal C. Thus a final luminance of a pixel in the first frame F1 is reduced as the dielectric constant is increased, so that the position of the cusp Pc is lower. A final voltage of the pixel is approximately 1.6V. As the dielectric constant is increased, the final voltage of the pixel is slightly reduced.

Next, in a state in which the cell gap is set to a fixed value, the response speed and the luminance for a liquid crystal display comprising the liquid crystal A was measured while the capacitance ratio was varied.

Figure 11B:
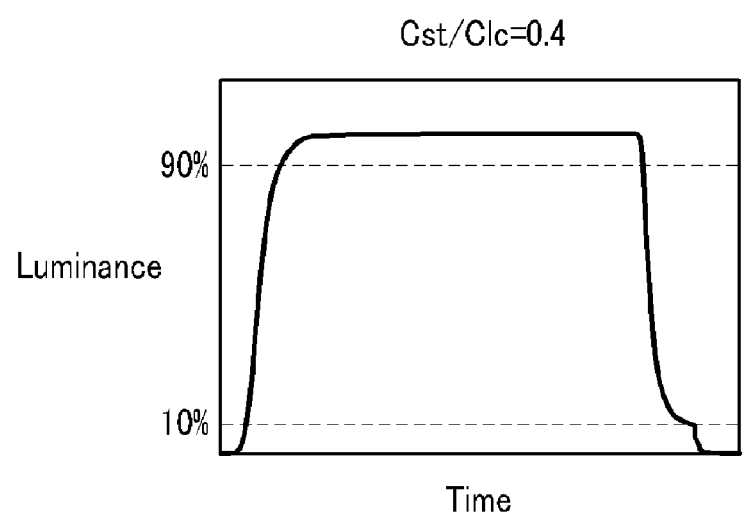
Figure 11C:
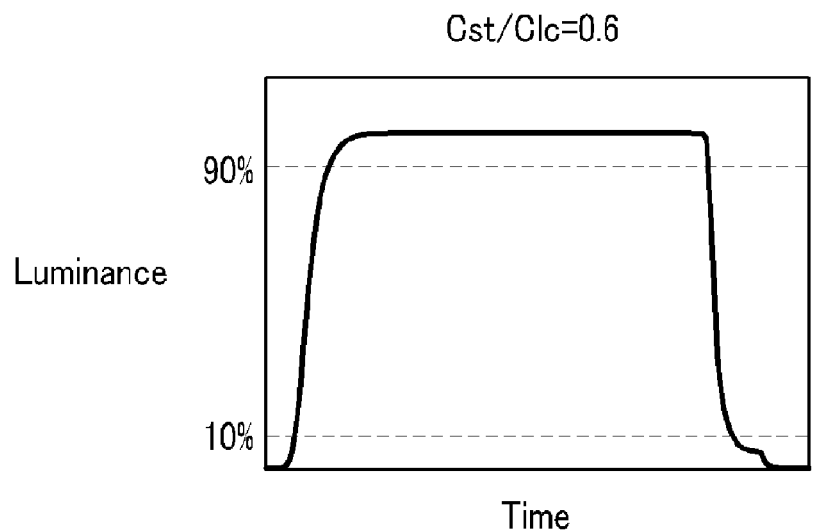

Table 4 shows the response time and the cusp position in an embodiment in which the capacitance ratio is 0.232, 0.4, 0.6, or 0.8 when the cell gap is 3.6 μm. FIG. 11A, FIG. 11B, and FIG. 11C show a luminance curves for capacitance ratios of 0.232, 0.4, and 0.6 in an embodiment in which the cell gap is fixed to 3.6 μm.

TABLE 4

| Capacitance Ratio | Response time (ms) | | | Cusp position (%) |
| --- | --- | --- | --- | --- |
| | Tr | Tf | Tt | |
| 0.232 | 15.38 | 10.29 | 25.67 | 18.77 |
| 0.4 | 12.59 | 9.67 | 22.26 | 10.00 |
| 0.6 | 6.62 | 9.33 | 15.95 | 3.70 |
| 0.8 | 5.11 | 9.13 | 14.24 | 2.48 |

As shown in Table 4 and FIG. 11A to FIG. 11C, in an embodiment in which the capacitance ratio is 0.4 or more, the cusp position is equal to or less than 10%, while in an embodiment in which the capacitance ratio is 0.6 or more, the response time is also below 16 ms.

Figure 12A:
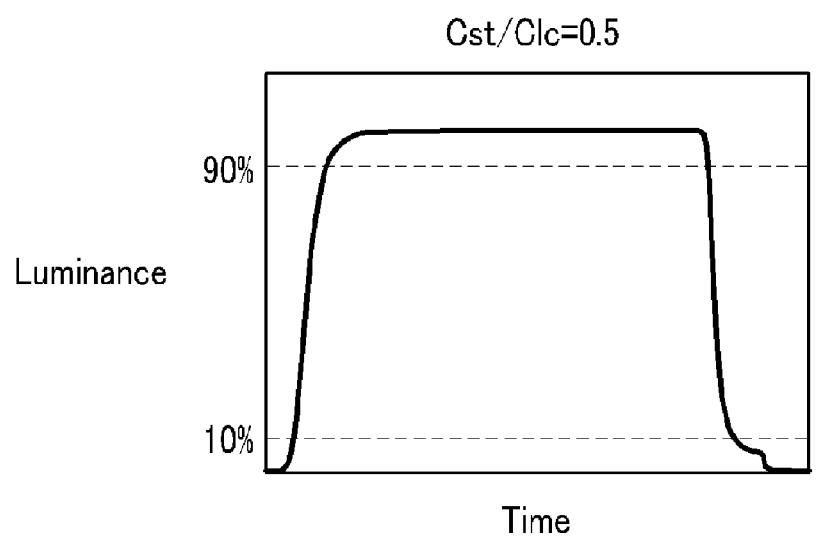
Figure 12B:
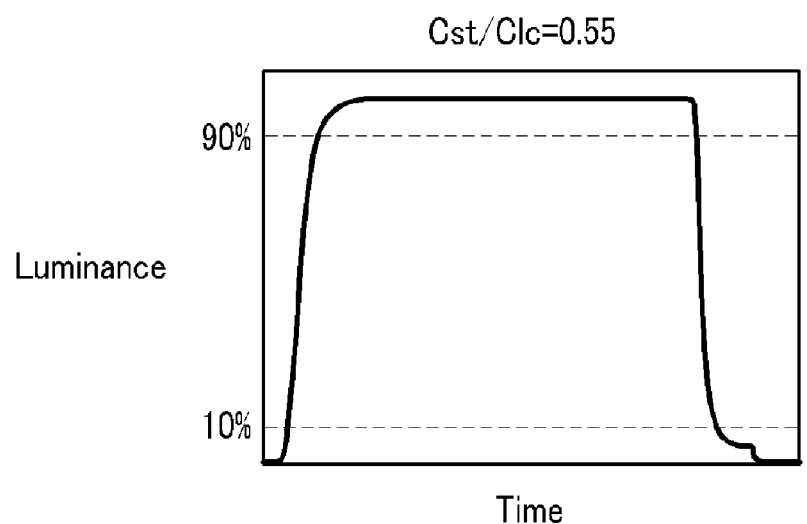
Figure 12C:
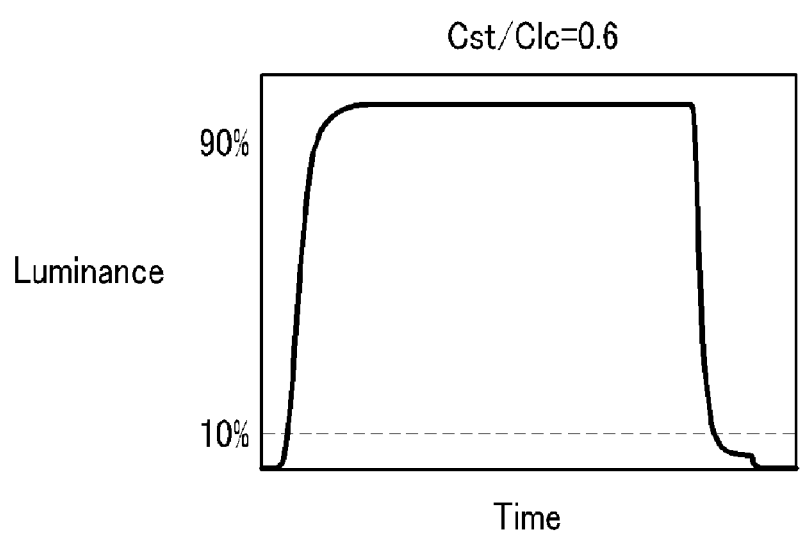

Table 5 shows the response time and the cusp position for each of the capacitance ratios 0.4, 0.5, 0.55, and 0.6 in an embodiment in which the cell gap is fixed at 3.3 μm. FIG. 12A, FIG. 12B, and FIG. 12C show luminance curves for capacitance ratios of 0.5, 0.55, and 0.6 in an embodiment in which the cell gap is fixed at 3.0 μm, respectively.

TABLE 5

| Capacitance Ratio | Response time (ms) | | | Cusp position (%) |
| --- | --- | --- | --- | --- |
| | Tr | Tf | Tt | |
| 0.4 | 10.66 | 9.07 | 19.73 | 8.9 |
| 0.5 | 7.33 | 9.41 | 16.74 | 4.9 |
| 0.55 | 5.7 | 8.67 | 14.37 | 4.7 |
| 0.6 | 5.19 | 8.68 | 13.87 | 3.4 |

As shown in Table 5 and FIG. 12A to FIG. 12C, in an embodiment in which the capacitance ratio is 0.4 or more, the cusp position is below 10%, while in an embodiment in which the capacitance ratio is 0.5 or more, the response time is below 16 ms.

In a state in which the capacitance is set to a fixed value, the response time and the luminance with respect to each of the liquid crystal compositions A, B, and C were measured.

Figure 13A:
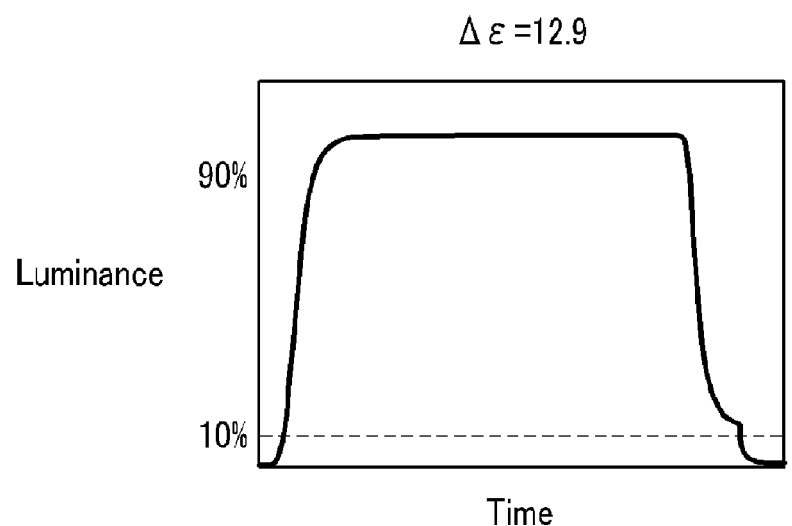
Figure 13B:
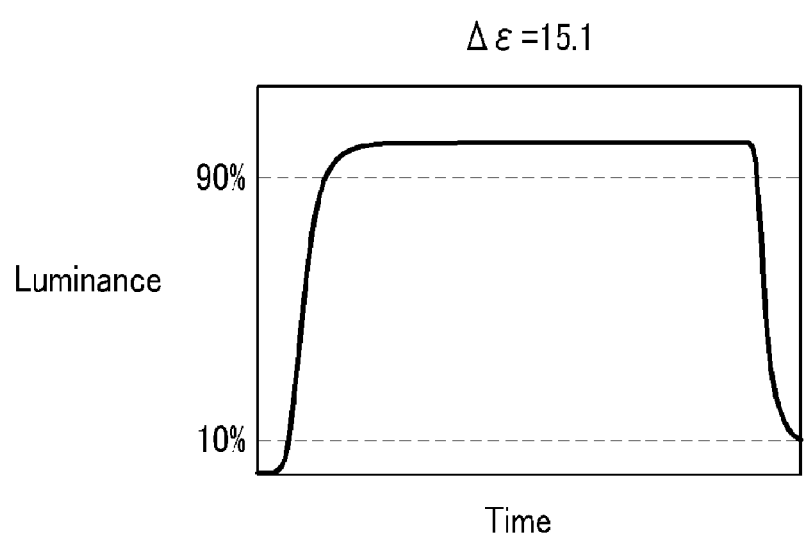
Figure 13C:
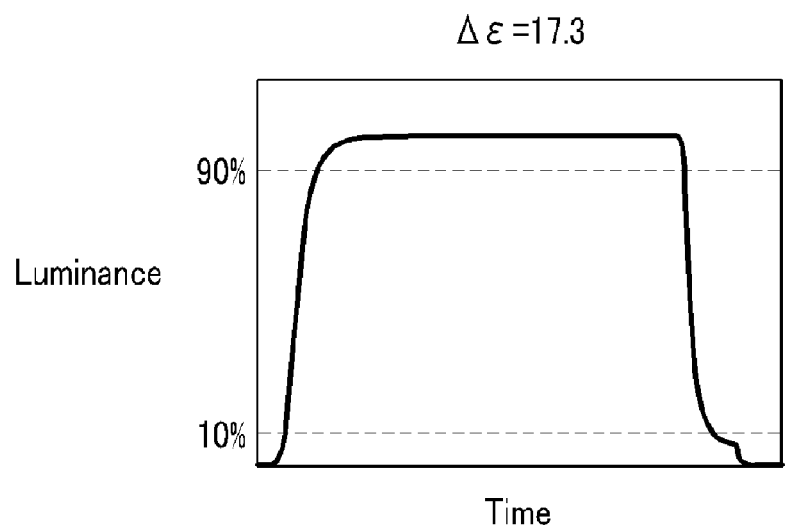

Table 6 shows the response time and the cusp position with respect to the liquid crystal compositions A, B, and C in a state in which the capacitance ratio is fixed at 0.5. FIG. 13A, FIG. 13B, and FIG. 13C show the luminance of liquid crystal displays comprising the liquid crystal compositions C, B, and A, respectively, under the same conditions.

TABLE 6

| LC Composition | Capacitance Ratio | Response time (ms) | | | Cusp position (%) |
| --- | --- | --- | --- | --- | --- |
| | | Tr | Tf | Tt | |
| C | 0.5 | 14.52 | 9.03 | 23.55 | 12.0 |
| B | 0.5 | 9.66 | 7.89 | 17.55 | 8.3 |
| A | 0.5 | 8.27 | 9.5 | 17.77 | 5.7 |

Figure 14A:
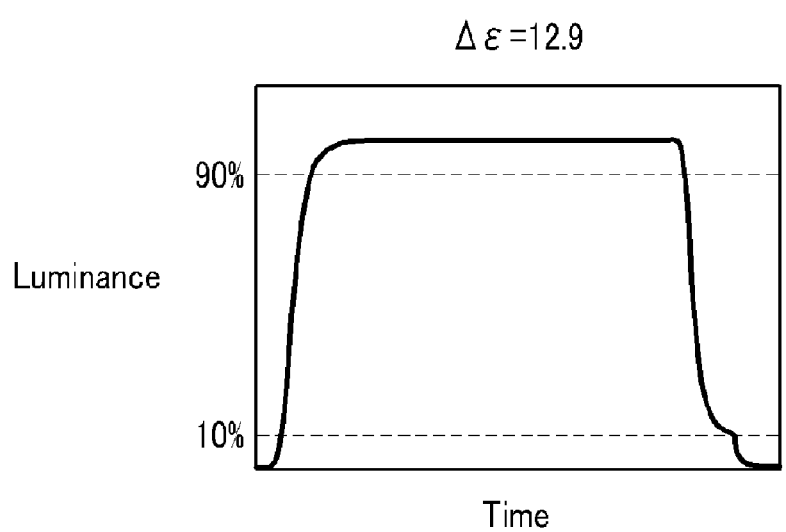
Figure 14B:
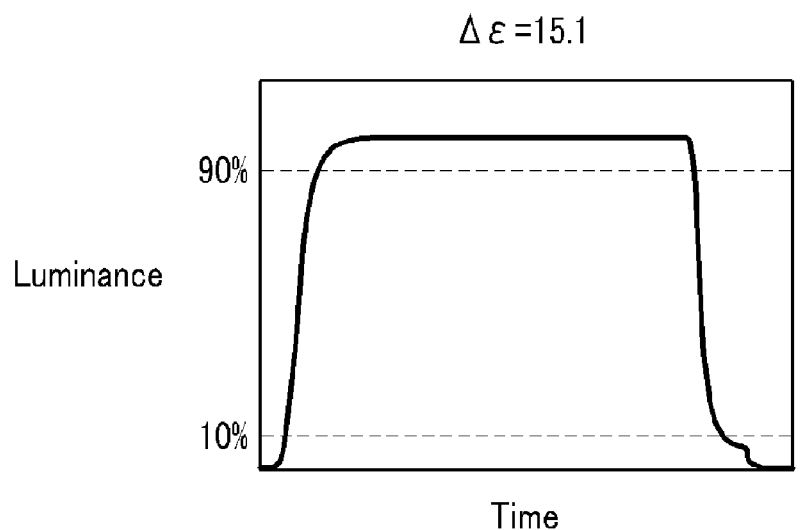
Figure 14C:
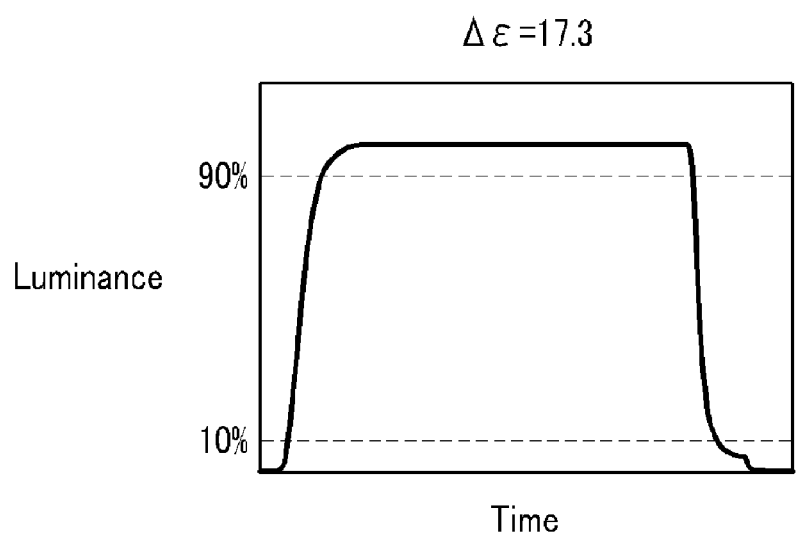

Table 7 shows the response time and the cusp position with respect to the liquid crystals A, B, and C in a state in which the capacitance is fixed to 0.6. FIG. 14A, FIG. 14B, and FIG. 14C show the luminance of liquid crystal displays comprising the liquid crystal compositions C, B, and A, respectively, under the same conditions.

TABLE 7

| LC Composition | Capacitance Ratio | Response time (ms) | | | Cusp position (%) |
|---|---|---|---|---|---|
| | | Tr | Tf | Tt | |
| C | 0.6 | 14.28 | 8.93 | 23.21 | 10.1 |
| B | 0.6 | 7.2 | 7.79 | 14.99 | 5.5 |
| A | 0.6 | 6.62 | 9.33 | 15.95 | 3.70 |

As shown in Table 6, Table 7, and FIG. 13A to FIG. 14C, as the dielectric anisotropy is increased, the cusp position is lowered. As shown in Table 6 and Table 7, the total response time Tt is approximately 16 ms in the exemplary embodiment comprising the liquid crystal compositions B and A, but in the exemplary embodiment comprising the liquid crystal composition C, which has a low dielectric anisotropy, the cusp position is over 10% and the total response time Tt is over 20 ms even though the capacitance ratio is set to 0.6. From this result, it can be observed that the dielectric anisotropy is desirably selected to be approximately 14 or more.

The response time and the cusp position were measured using the liquid crystal compositions D and E, which have almost the same dielectric anisotropy and rotational viscosity as the other liquid crystals, but have different elastic coefficients. The dielectric anisotropy, the rotational viscosity, and the effective elastic coefficient Keff of the liquid crystal composition D are 15.2, 100, and 12.5 (splay elastic coefficient K11=12.9 and band elastic coefficient K33=11.4), respectively. The dielectric anisotropy, the rotational viscosity, and the effective elastic coefficient Keff of the liquid crystal composition E are 15.7, 100, and 9.6 (K11=8.9 and K33=11.8), respectively.

Figure 15A:
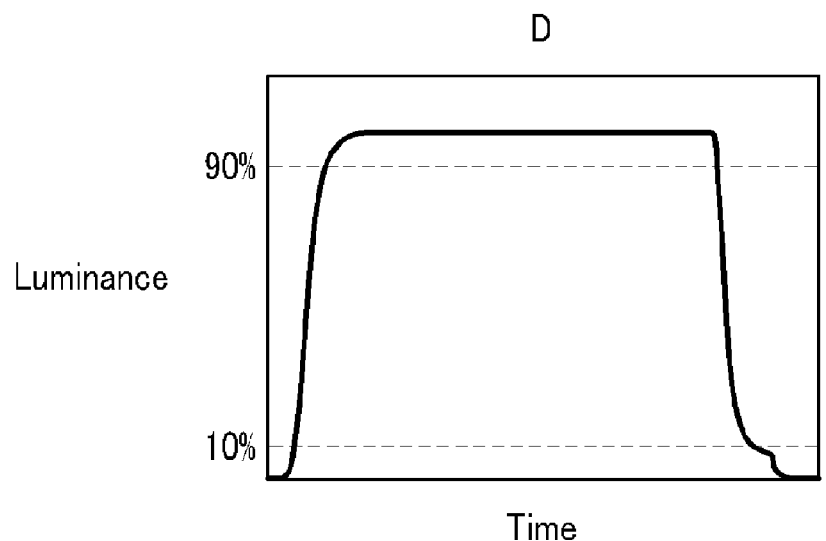
Figure 15B:
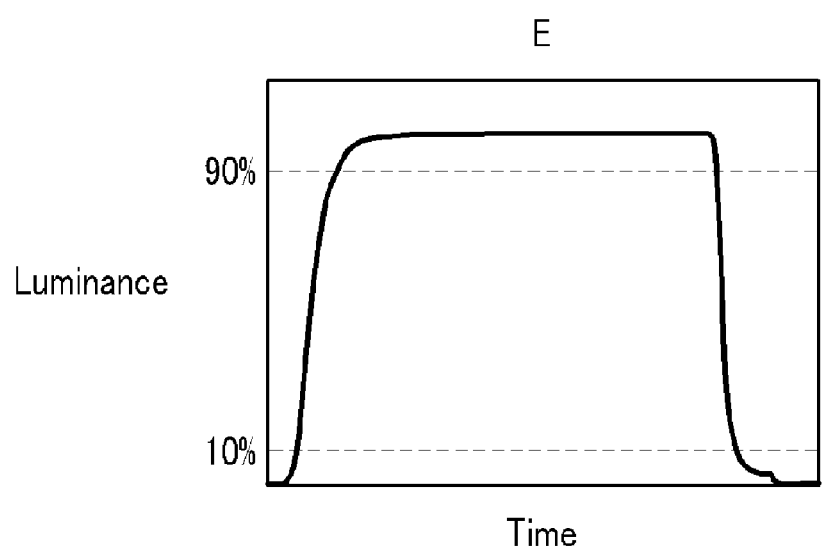

Table 8 shows the response time and the cusp position for the liquid crystal compositions D and E when the capacitance ratios are 0.232 and 0.6. FIG. 15A and FIG. 15B show the luminance of liquid crystal displays comprising the liquid crystal compositions D and E in a state in which the capacitance is set to 0.6.

TABLE 8

| LC Composition | Capacitance Ratio | Response time (ms) | | | Cusp position (%) |
|---|---|---|---|---|---|
| | | Tr | Tf | Tt | |
| D | 0.232 | 15.57 | 8.9 | 24.47 | 20.1 |
| | 0.6 | 9.33 | 8.41 | 17.24 | 7.5 |
| E | 0.232 | 14.86 | 12.19 | 27.05 | 12.16 |
| | 0.6 | 5.51 | 11.02 | 16.53 | 2.7 |

As shown in Table 8, FIG. 15A, and FIG. 15B, as the effective elastic coefficient is reduced, the cusp position is lowered. When the effective elastic coefficient is 10 or less, the cusp position is below 10% and the total response time Tt is approximately 16 ms when the capacitance ratio is equal to 0.6.

To determine an influence of the pitch of liquid crystal layer 3 on the response time and the cusp position, an experiment was performed in a state in which the pitch of the liquid crystal A was varied.

Figure 16A:
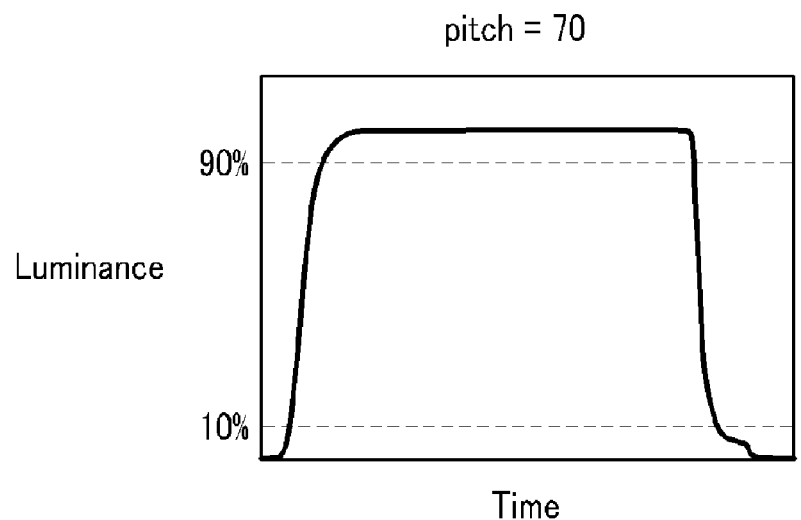
Figure 16B:
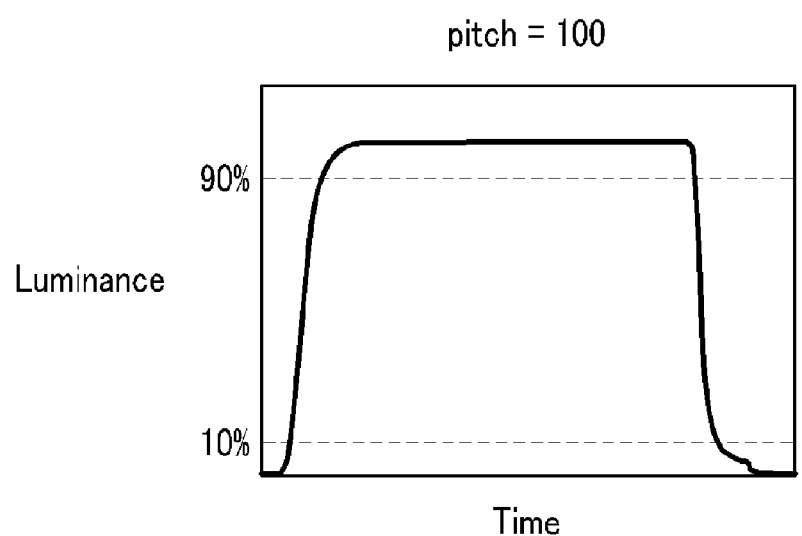
Figure 16C:
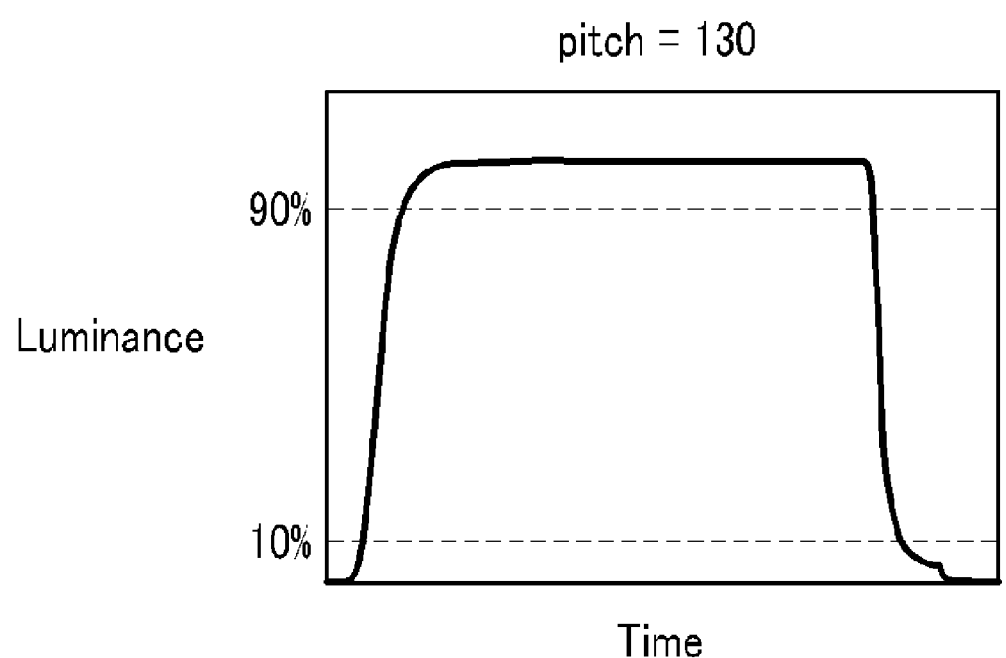

Table 9 shows the response time and the cusp position measured when the pitch of a liquid crystal display comprising the liquid crystal composition A was set to 40, 70, 100, or 140 with the capacitance ratios of 0.4 and 0.6, respectively. FIG. 16A, FIG. 16B, and FIG. 16C show the luminance of liquid displays having pitches of 70, 100, or 130 in a state in which the capacitance ratio is set to 0.6.

TABLE 9

| Pitch | Capacitance Ratio | Response time (ms) | | | Cusp position (%) |
|---|---|---|---|---|---|
| | | Tr | Tf | Tt | |
| 40 | 0.4 | 14.95 | 9.28 | 24.23 | 11.29 |
| | 0.6 | 7.43 | 9.01 | 16.44 | 6.1 |
| 70 | 0.4 | 12.59 | 9.67 | 22.26 | 10.00 |
| | 0.6 | 6.62 | 9.33 | 15.95 | 4.9 |
| 100 | 0.4 | 11.08 | 9.83 | 20.91 | 8.64 |
| | 0.6 | 6.4 | 9.5 | 15.9 | 4.6 |
| 130 | 0.4 | 10.52 | 9.93 | 20.45 | 8.24 |
| | 0.6 | 6.27 | 9.56 | 15.85 | 3.5 |

As shown in Table 9 and FIG. 16A to FIG. 16C, as the pitch is increased, the rising time Tr and the total response time Tt become shorter, and the cusp position is lowered. Accordingly, it has been observed that a pitch set to 100 or more is desirable for low voltage driving since the cusp position is below approximately 10% when the capacitance ratio is approximately 0.4, and the response time is below approximately 16 ms for a capacitance of 0.6 when the pitch is set to 100 or more.

Although exemplary embodiments have been described herein with reference to the accompanying drawings, it is to be understood that the present invention should not be limited to the disclosed embodiments and that various other changes and modifications may be made by those skilled in the art without departing from the scope or spirit of the invention.

What is claimed is:

1. A liquid crystal display, comprising:
   a thin film transistor;
   a liquid crystal capacitor, which is electrically connected to the thin film transistor and comprises a liquid crystal layer; and
   a storage capacitor, which is electrically connected to the thin film transistor in parallel to the liquid crystal capacitor,
   wherein the liquid crystal layer has a positive dielectric anisotropy and is disposed in a twisted nematic mode, and
   a capacitance ratio of a capacitance of the storage capacitor to a capacitance of the liquid crystal capacitor is approximately 0.4 to 0.7.

2. The liquid crystal display of claim 1, wherein a dielectric anisotropy of the liquid crystal layer is approximately 14 or more.

3. The liquid crystal display of claim 2, wherein the dielectric anisotropy of the liquid crystal layer is in a range of approximately 15 to approximately 18.

4. The liquid crystal display of claim 3, wherein the dielectric anisotropy of the liquid crystal layer is in a range of approximately 15.1 to approximately 17.3.

5. The liquid crystal display of claim 3, wherein a thickness of the liquid crystal layer is in a range of approximately 3 micrometers to approximately 4 micrometers.

6. The liquid crystal display of claim 5, wherein the thickness of the liquid crystal layer is in a range of approximately 3.3 micrometers to approximately 3.6 micrometers.

7. The liquid crystal display of claim 1, wherein the liquid crystal layer comprises a liquid crystal composition selected from groups each consisting of liquid crystal compositions I to IV, wherein the liquid crystal composition I comprises compounds of formulas

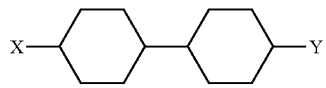

in an amount of approximately 31.5 weight percent,

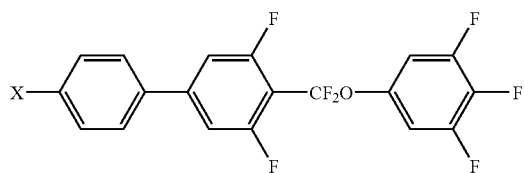

in an amount of approximately 15 weight percent,

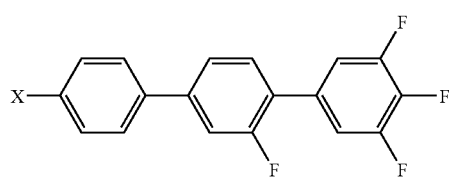

in an amount of approximately 10 weight percent,

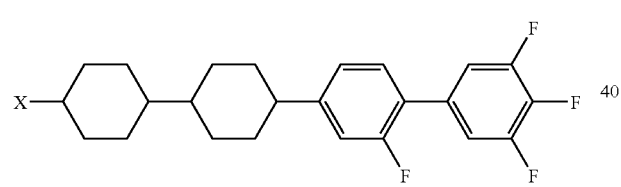

in an amount of approximately 7 weight percent,

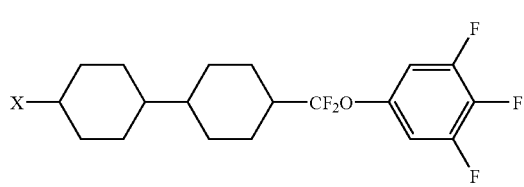

in an amount of approximately 18.5 weight percent,

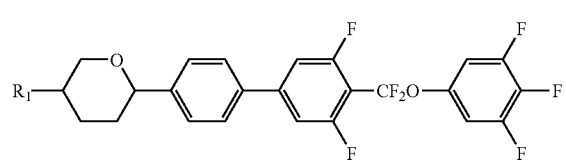

in an amount of approximately 12 weight percent,

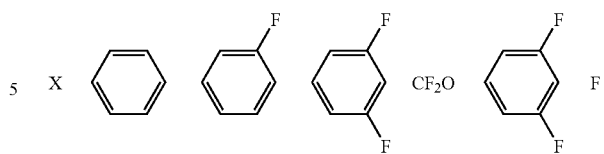

in an amount of approximately 6 weight percent, the liquid crystal composition II comprises compounds of the formulas

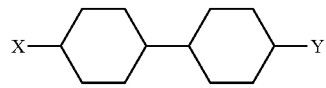

in an amount of approximately 41 weight percent,

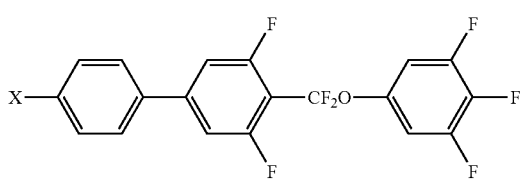

in an amount of approximately 13 weight percent,

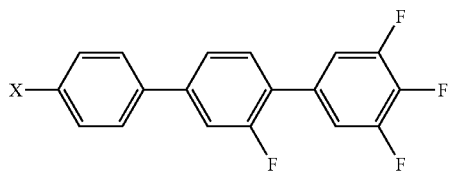

in an amount of approximately 8.5 weight percent,

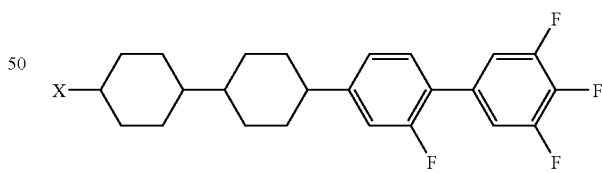

in an amount of approximately 6.5 weight percent,

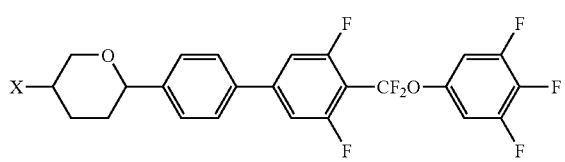

in an amount of approximately 12 weight percent,

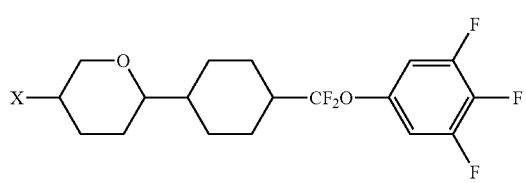

in an amount of 8 weight percent,

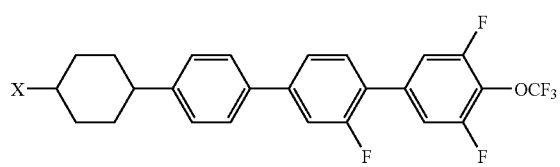

in an amount of approximately 6 weight percent,

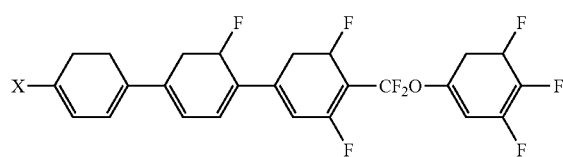

in an amount of approximately 5 weight percent,
the liquid crystal composition III comprises compounds of the formulas

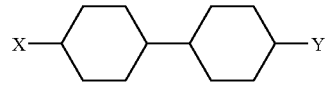

in an amount of approximately 21.5 weight percent,

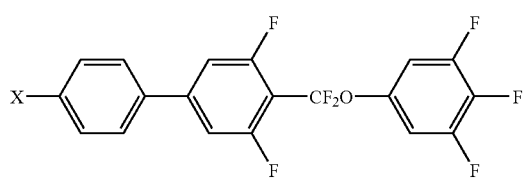

in an amount of approximately 10 weight percent,

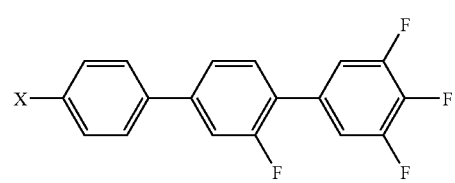

in an amount of approximately 7 weight percent,

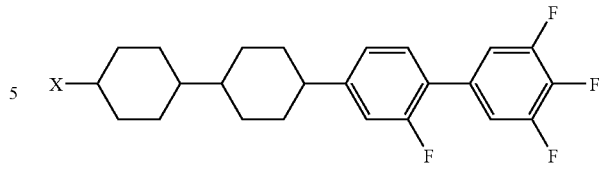

in an amount of approximately 5 weight percent,

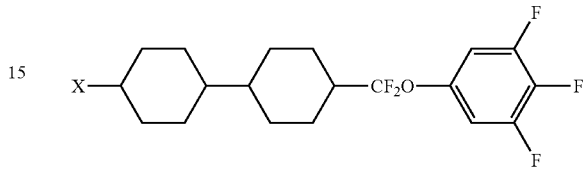

in an amount of approximately 27 weight percent,

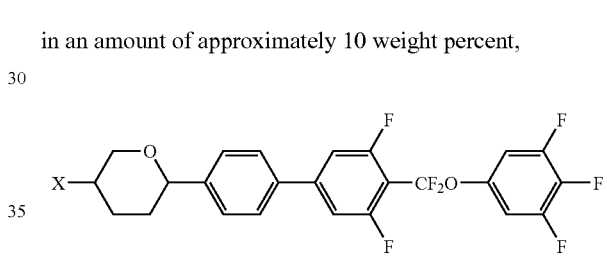

in an amount of approximately 10 weight percent,

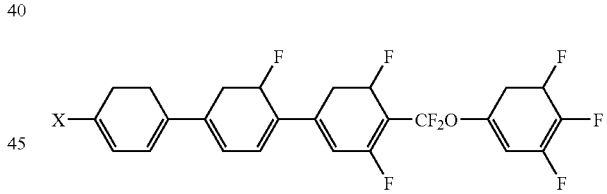

in an amount of approximately 13.5 weight percent,

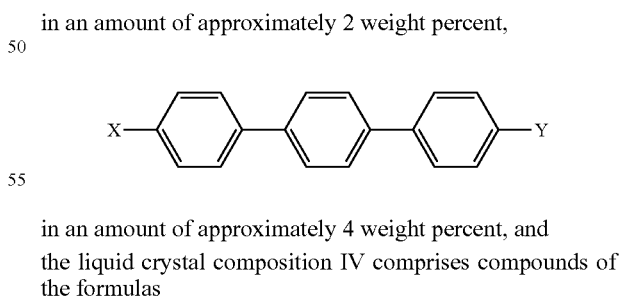

in an amount of approximately 2 weight percent, in an amount of approximately 4 weight percent, and
the liquid crystal composition IV comprises compounds of the formulas

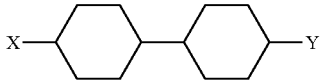

in an amount of approximately 12 weight percent,

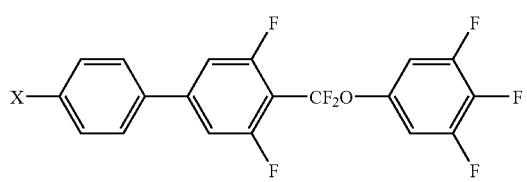

in an amount of approximately 5.5 weight percent,

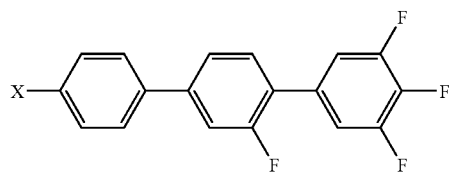

in an amount of approximately 10 weight percent,

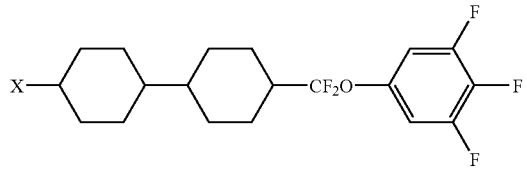

in an amount of approximately 35 weight percent,

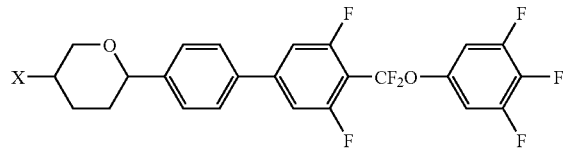

in an amount of approximately 14 weight percent,

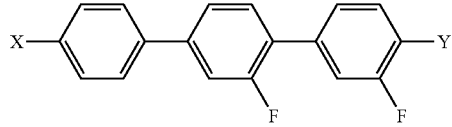

in an amount of approximately 5 weight percent,

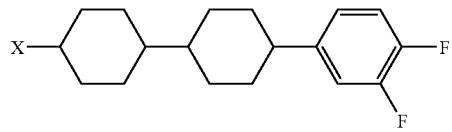

in an amount of approximately 8.5 weight percent,

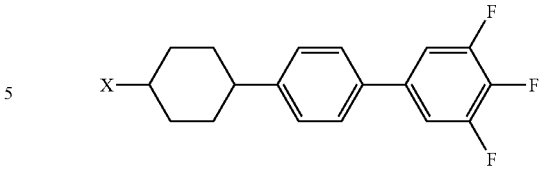

in an amount of approximately 10 weight percent, based on a total weight of the liquid crystal composition, and X and Y are independently one of an alkyl group, an alkynyl group and an alkoxy group.

8. The liquid crystal display of claim 1, wherein a thickness of the liquid crystal layer is in a range of approximately 3 micrometers to approximately 4 micrometers.

9. The liquid crystal display of claim 8, wherein the thickness of the liquid crystal layer is in a range of approximately 3.3 micrometers to approximately 3.6 micrometers.

10. The liquid crystal display of claim 1, wherein an effective elastic coefficient of the liquid crystal layer is approximately 10 or less.

11. The liquid crystal display of claim 1, wherein a pitch of the liquid crystal layer is approximately 100 or more.

12. The liquid crystal display of claim 1, wherein
   the liquid crystal display is in a normally white mode, and
   a final luminance is approximately 10 percent or less for one frame when a voltage difference between both ends of the liquid crystal capacitor is changed from 0 volts to approximately 2.5 volts.

13. The liquid crystal display of claim 1, wherein the liquid crystal layer comprises a liquid crystal composition comprising at least one compound of the formulas

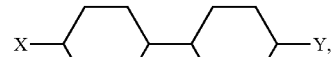

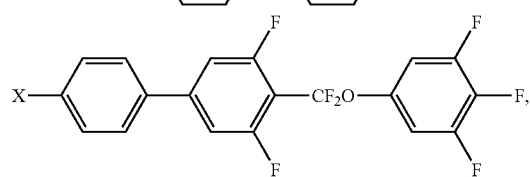

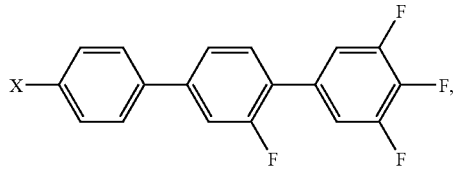

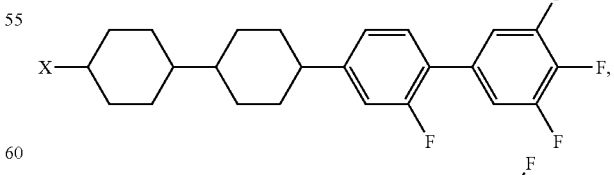

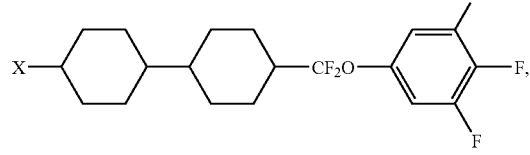

-continued
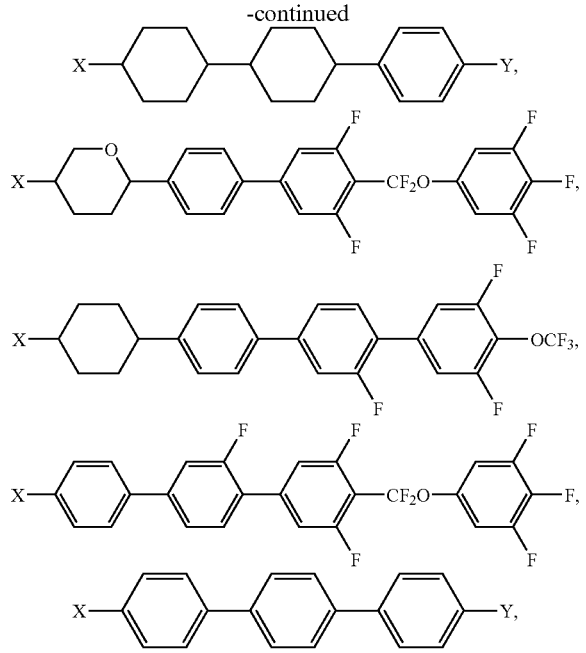
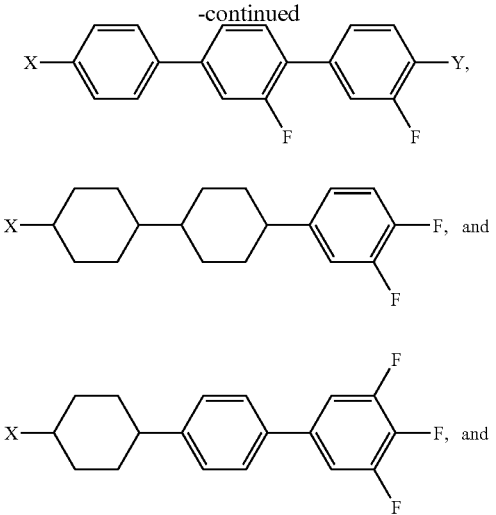
X and Y are independently one of an alkyl group, an alkynyl group and an alkoxy group.
* * * * *